(12) United States Patent
Schechter

(10) Patent No.: US 10,401,237 B2
(45) Date of Patent: Sep. 3, 2019

(54) ENVIRONMENTAL SENSOR CERTIFICATION SYSTEM

(71) Applicant: Digi International, Inc., Minnetonka, MN (US)

(72) Inventor: Harry J. Schechter, Needham, MA (US)

(73) Assignee: Digi International Inc., Minnetonka, MN (US)

( * ) Notice: Subject to any disclaimer, the term of this patent is extended or adjusted under 35 U.S.C. 154(b) by 175 days.

(21) Appl. No.: 15/590,635

(22) Filed: May 9, 2017

(65) Prior Publication Data
US 2017/0328791 A1    Nov. 16, 2017

Related U.S. Application Data

(60) Provisional application No. 62/336,438, filed on May 13, 2016.

(51) Int. Cl.
*G01K 15/00* (2006.01)
*G06Q 10/00* (2012.01)

(52) U.S. Cl.
CPC .......... *G01K 15/007* (2013.01); *G06Q 10/00* (2013.01)

(58) Field of Classification Search
CPC ...... G01K 15/007; G01K 1/024; G06Q 10/00; H04Q 9/00
USPC .......... 702/182; 340/539.26, 870, 90, 870.09
See application file for complete search history.

(56) References Cited

U.S. PATENT DOCUMENTS

| | | | |
|---|---|---|---|
| 3,690,175 A | 9/1972 | Butts | |
| 4,003,124 A | 1/1977 | Connick | |
| 4,293,916 A | 10/1981 | Del Re et al. | |
| 4,468,135 A | 8/1984 | McCain et al. | |
| 5,355,686 A | 10/1994 | Weiss | |
| 5,892,441 A | 4/1999 | Woolley et al. | |
| 6,112,246 A | 8/2000 | Horbal et al. | |
| 6,502,409 B1 | 1/2003 | Gatling et al. | |
| 6,509,830 B1 | 1/2003 | Elliott | |
| 6,553,336 B1 | 4/2003 | Johnson et al. | |
| 6,646,564 B1 | 11/2003 | Azieres et al. | |
| 6,741,174 B2 | 5/2004 | Rhoades et al. | |

(Continued)

OTHER PUBLICATIONS

Non-Final Office Action from U.S. Appl. No. 13/554,877 dated Apr. 9, 2013.

(Continued)

*Primary Examiner* — John H Le
(74) *Attorney, Agent, or Firm* — Wolf, Greenfield & Sacks, P.C.

(57) ABSTRACT

Embodiments of a certification system for use with an environmental monitoring system that may monitor environmental parameters of multiple different environments. The certification system, which includes one or more computing devices, monitors the certification of environmental sensors of the system. When the certification system detects that the certification of a sensor in a first environment satisfies a condition, such as that the certification is to expire within a threshold period of time, the system triggers the distribution of a certified sensor to an operator of the first environment to replace the sensor for which the certification is to expire. For example, the system may trigger the environmental monitoring system to send a newly-certified sensor to the first operator of the first environment.

20 Claims, 10 Drawing Sheets

(56) References Cited

U.S. PATENT DOCUMENTS

| | | | |
|---|---|---|---|
| 6,817,757 B1 | 11/2004 | Wallace | |
| 6,976,368 B1 | 12/2005 | Lamstaes et al. | |
| 7,026,929 B1 | 4/2006 | Wallace | |
| 7,191,097 B1 | 3/2007 | Lee et al. | |
| 7,342,504 B2 | 3/2008 | Crane et al. | |
| 7,456,736 B2 | 11/2008 | Primm et al. | |
| 7,483,805 B2 | 1/2009 | Sparks et al. | |
| 7,688,952 B2 | 3/2010 | Light et al. | |
| 7,822,387 B2 | 10/2010 | Gross | |
| 7,902,975 B2 | 3/2011 | Glenn et al. | |
| 7,952,485 B2 | 5/2011 | Schechter et al. | |
| 8,181,113 B2 | 5/2012 | Abbott et al. | |
| 8,228,183 B2 | 7/2012 | Glenn et al. | |
| 8,248,252 B2 | 8/2012 | Schechter et al. | |
| 8,353,870 B2 | 1/2013 | Levin et al. | |
| 8,547,226 B2 | 10/2013 | Schechter et al. | |
| 8,599,012 B2 | 12/2013 | Schechter et al. | |
| 8,779,926 B2 | 7/2014 | Schechter | |
| 9,092,967 B2 | 7/2015 | Schechter | |
| 9,247,322 B1* | 1/2016 | Schechter | H04Q 9/00 |
| 9,500,532 B2 | 11/2016 | Schechter et al. | |
| 9,541,454 B2 | 1/2017 | Schechter et al. | |
| 2002/0161624 A1 | 10/2002 | Bradlee | |
| 2006/0028335 A1 | 2/2006 | Glenn et al. | |
| 2006/0186197 A1 | 8/2006 | Rosenberg | |
| 2006/0218057 A1 | 9/2006 | Fitzpatrick et al. | |
| 2006/0271695 A1 | 11/2006 | Lavian | |
| 2007/0006604 A1 | 1/2007 | Behr | |
| 2007/0139183 A1 | 6/2007 | Kates | |
| 2007/0273557 A1 | 11/2007 | Baillot | |
| 2007/0287477 A1 | 12/2007 | Tran | |
| 2008/0052044 A1 | 2/2008 | Shoenfeld | |
| 2008/0129465 A1 | 6/2008 | Rao | |
| 2008/0155064 A1 | 6/2008 | Kosuge et al. | |
| 2008/0176539 A1 | 7/2008 | Staton et al. | |
| 2008/0186166 A1 | 8/2008 | Zhou et al. | |
| 2009/0282715 A1 | 11/2009 | Pemberton | |
| 2010/0127880 A1 | 5/2010 | Schechter et al. | |
| 2010/0127881 A1 | 5/2010 | Schechter et al. | |
| 2010/0312881 A1 | 12/2010 | Davis et al. | |
| 2011/0060571 A1 | 3/2011 | Ueda et al. | |
| 2011/0068929 A1 | 3/2011 | Franz et al. | |
| 2012/0078723 A1 | 3/2012 | Stewart | |
| 2012/0109449 A1 | 5/2012 | Boehme et al. | |
| 2012/0280834 A1 | 11/2012 | Schechter et al. | |
| 2012/0286969 A1 | 11/2012 | Schechter et al. | |
| 2013/0147630 A1 | 6/2013 | Nakaya et al. | |
| 2013/0169443 A1 | 7/2013 | Schechter | |
| 2013/0311140 A1 | 11/2013 | Schechter | |
| 2013/0346125 A1 | 12/2013 | Grant et al. | |
| 2014/0033759 A1 | 2/2014 | Ide et al. | |
| 2014/0107993 A1 | 4/2014 | Cheng | |
| 2014/0223230 A1 | 8/2014 | Schechter et al. | |
| 2014/0278332 A1 | 9/2014 | Grammatikakis et al. | |
| 2014/0029522 A1 | 10/2014 | Schechter | |
| 2015/0120586 A1 | 4/2015 | Schechter | |
| 2015/0213162 A1 | 7/2015 | Schechter et al. | |
| 2015/0316942 A1 | 11/2015 | Schechter | |
| 2015/0369671 A1 | 12/2015 | Schechter et al. | |
| 2016/0349116 A1* | 12/2016 | Schechter | H04Q 9/00 |
| 2016/0357892 A1 | 12/2016 | Schechter et al. | |

OTHER PUBLICATIONS

[No Author Listed] Cryolog, Traceo product literature, http://www.cryolog.com/en/pages/products_and_services/traceo/index.php, 2007. Last accessed Oct. 23, 2008, 1 page.

[No Author Listed] EasyLog USB Data Logger product literature, http://www.lascarelectronics.com/temperaturedatalogger.php?datalogger=102, Last accessed Oct. 23, 2008, 1 page.

[No Author Listed] http://www.bapihvac.com/CatalogPDFs/1 App Notes/Thermal Buffer Temp Sensing.pdf, Rev. Mar. 3, 2008. Last accessed May 1, 2014, 1 page.

[No Author Listed] http://www.fishersci.com/ecomm/servlet/itemdetail?catnum=NC0278993&storeid=10652, copyright 2014, Last accessed May 1, 2014, 1 page.

[No Author Listed] http://www.kele.com/temperature-sensors-and-transmitters/as10-series.aspx, Last accessed May 1, 2014, 2 pages.

[No Author Listed] http://www.prweb.com/releases/refrigeration/efficiency/prweb10684359.htm, Last accessed May 1, 2014, 2 pages.

[No Author Listed] http://www.temprotect.com/action/shop/viewitem/?itemType=72&name=Glycol%20Buffer%20Vial. Last accessed Jul. 9, 2014, 2 pages.

[No Author Listed] http://www.thermcoproductsinc.com/vaccine-thermometers.html, Last accessed May 1, 2014, 4 pages.

[No Author Listed] http://www.vfcdataloggers.com/probevial-1.aspx, Copyright 2014 Dataloggers, Last accessed May 1, 2014, 2 pages.

[No Author Listed] iButtonLink Temperature Monitor product literature, http://www.ibuttonlink.com/1-wire-interface-masters.aspx, Last accessed Oct. 23, 2008, 2 pages.

[No Author Listed] IT Watchdogs WeatherDuck product literature, http://www.itwatchdogs.com/duckdetails.shtml, 2002-2005, Last accessed Oct. 23, 2008, 1 page.

[No Author Listed] THUM—Temperature Humidity USB Monitor product literature, Practical Design Group, LLC, http://practsol.com/thum.htm, 2004-2008, Last accessed Oct. 23, 2008, 3 pages.

[No Author Listed] USB Tenki: USB Temperature sensors and more product literature, http://www.raphnet.net/electronique/usbtenki/index_en.php, pp. 1-8, 2002-2008, Last accessed Oct. 23, 2008, 8 pages.

[No Author Listed] WiFi Vaccine Temperature Data Logger http://www.dicksondata.com/products/WFT21 Last accessed May 1, 2014, 3 pages.

[No Author Listed] ZigBee—Wikipedia, the free encyclopedia. available at http://en.wikipedia.org/wiki/Zigbee, Last accessed Dec. 23, 2011, 12 pages.

Abbasi et al., "A survey on clustering algorithms for wireless sensor networks," Computer Communications 30, published 2007;2826-41.

Savvides et al., "The Bits and Flops of the N-hop Multilateration Primitive for Node Localization Problems," WSNA'02, Sep. 28, 2002, Atlanta, Georgia. 10 pages.

Sugano et al., "Indoor Localization System Using RSSI Measurement of Wireless Sensor network Based on Zigbee Standard", Wireless and Optical Communications, 2006, pp. 1-6.

Younis et al., "Distributed Clustering in Ad-hoc Sensor Networks: A Hybrid, Energy-Efficient Approach," In Proceedings of IEEE INFOCOM, vol. 1, pp. 1-12, Mar. 2004.

Zanca et al., "Experimental comparison of RSSI-based localization algorithms for indoor wireless sensor networks," REALWSN'08, Apr. 1, 2008, p. 1-5. Glasgow, United Kingdom.

Zhao et al., "Wireless Sensor Networks, An Information Processing Approach," Morgan Kaufmann Publishers, 2004, 24 pages.

* cited by examiner

ENVIRONMENTAL SENSOR CERTIFICATION SYSTEM

CROSS-REFERENCE TO RELATED APPLICATIONS

This application claims priority under 35 U.S.C. § 119(e) to U.S. Provisional Application Ser. No. 62/336,438, titled "Environmental Sensor Certification System," filed on May 13, 2016, the entirety of which is incorporated herein by reference.

BACKGROUND

Temperature monitoring is used in many industries. For example, restaurants and food processing companies that rely on refrigeration equipment to keep their products fresh frequently use temperature monitoring. If a malfunction of the refrigeration equipment is not detected promptly, food products could become too hot or too cold, resulting in spoilage or other damage to the food products. For a business that relies on food, such damage could result in a large monetary loss and potentially a serious business disruption.

As another example, companies that manufacture pharmaceutical drugs may monitor temperature of their products. For example, a chemical process on a drug precursor may only succeed in creating a finished product if the process is performed at a particular temperature sustained for a specific amount of time. Any deviations from the process temperature may put the quality of the finished drug at risk. These temperature-sensitive processes require constant and accurate monitoring of temperature to detect variations.

Temperature monitoring systems are known. These systems incorporate temperature sensors attached to or mounted near equipment for which temperature is to be monitored. The system responds if the temperature sensor indicates a temperature outside of a normal operating range. One type of response that has been used is to raise an alarm at a facility where the monitored equipment is located. Some systems use bells, flashing lights or other forms of audible or visible indications of an improper operating temperature.

Because of the sensitivity of some environments, such as pharmaceutical processes, operators of environments that include temperature monitoring systems may use temperature sensors whose performance has been certified according to the certification standards of a standards-setting body, such as the National Institute of Standards and Technology (NIST). Conventional certification processes involve comparing the reading of a test sensor to a reading from a certified reference sensor. The comparison may be performed over several different temperature points. If the difference between the sensor readings is within an acceptable tolerance, the test sensor may be certified. A printed certificate may then be issued that includes identification information for the sensors compared, results of the comparison at the test temperatures, and an expiration date of the certification status. Typically, the certification status expires in one year. After expiration, an operator of an environment may replace the expired sensor with another certified sensor, or recertify the expired sensor. To do so, the operator may request a professional to perform an on-site sensor recertification, return the expired sensor to be recertified and returned to the operator, or purchase a new certified sensor.

SUMMARY

In one embodiment, there is provided a method of operating at least one computing device of an environmental monitoring system. The environmental monitoring system monitors at least one environmental parameter of one or more environments. Each environment of the one or more environments is owned and/or managed by an operator of one or more operators and is remote from the at least one computing device. The method comprises storing, in at least one data store of the environmental monitoring system, first information regarding certification of proper operating performance of a first environmental sensor, the first information regarding certification comprising an expiration date of the certification. The method further comprises storing, in the at least one data store and in association with an account of a first operator with the environmental monitoring system, first data generated by the first environmental sensor, the first data generated by the first environmental sensor comprising a first value of a first environmental parameter sensed by the first environmental sensor in a first environment of the one or more environments, the first operator owning and/or managing the first environment. The method further comprises, in response to determining that the expiration date of the first environmental sensor satisfies a condition, triggering distribution to the first operator of a second environmental sensor and storing, in the at least one data store and in association with the account of the first operator with the environmental monitoring system, second data generated by the second environmental sensor. The second data generated by the second environmental sensor comprises a second value of the first environmental parameter sensed by the second environmental sensor in the first environment. In the method, storing the first data generated by the first environmental sensor and storing the second data generated by the second environmental sensor comprises receiving the first and second data transmitted over at least one wireless wide area network.

In another embodiment, there is provided at least one computer-readable storage medium encoded with computer-executable instructions that, when executed by at least one processor, cause the at least one processor to carry out a method of operating at least one computing device of a certification system for use with an environmental monitoring system. The environmental monitoring system monitors at least one environmental parameter of each of a plurality of environments. Each environment of the plurality of environments is owned and/or managed by an operator of a plurality of operators. The environmental monitoring system maintains information on an account of each of the plurality of operators. The method comprises storing, in at least one data store of the certification system, information regarding certification of operating performance of a first environmental sensor that is associated with a first operator of a first environment, the information regarding the certification comprising an expiration date of the certification. The method further comprises, in response to determining that the certification of the first environmental sensor satisfies a condition, triggering distribution of a second environmental sensor to the first operator and associating the second environmental sensor with data generated by the first environmental sensor.

In a further embodiment, there is provided an apparatus for use with an environmental monitoring system. The environmental monitoring system monitors at least one environmental parameter of each of a plurality of environments. Each environment of the plurality of environments is owned and/or managed by an operator of a plurality of operators. The environmental monitoring system maintains information on an account of each of the plurality of operators. The apparatus comprises at least one processor and at least one computer-readable storage medium encoded with computer-executable instructions that, when executed by at least one processor, cause the at least one processor to carry out a method of operating a certification system. The method comprises evaluating information regarding certification of operating performance of a first environmental sensor that is associated with a first operator of a first environment, the information regarding the certification comprising an expiration date of the certification, in response to determining that the certification of the first environmental sensor satisfies a condition, triggering distribution to the first operator of a second environmental sensor for which proper operating performance has been certified, and associating the second environmental sensor with data generated by the first environmental sensor.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
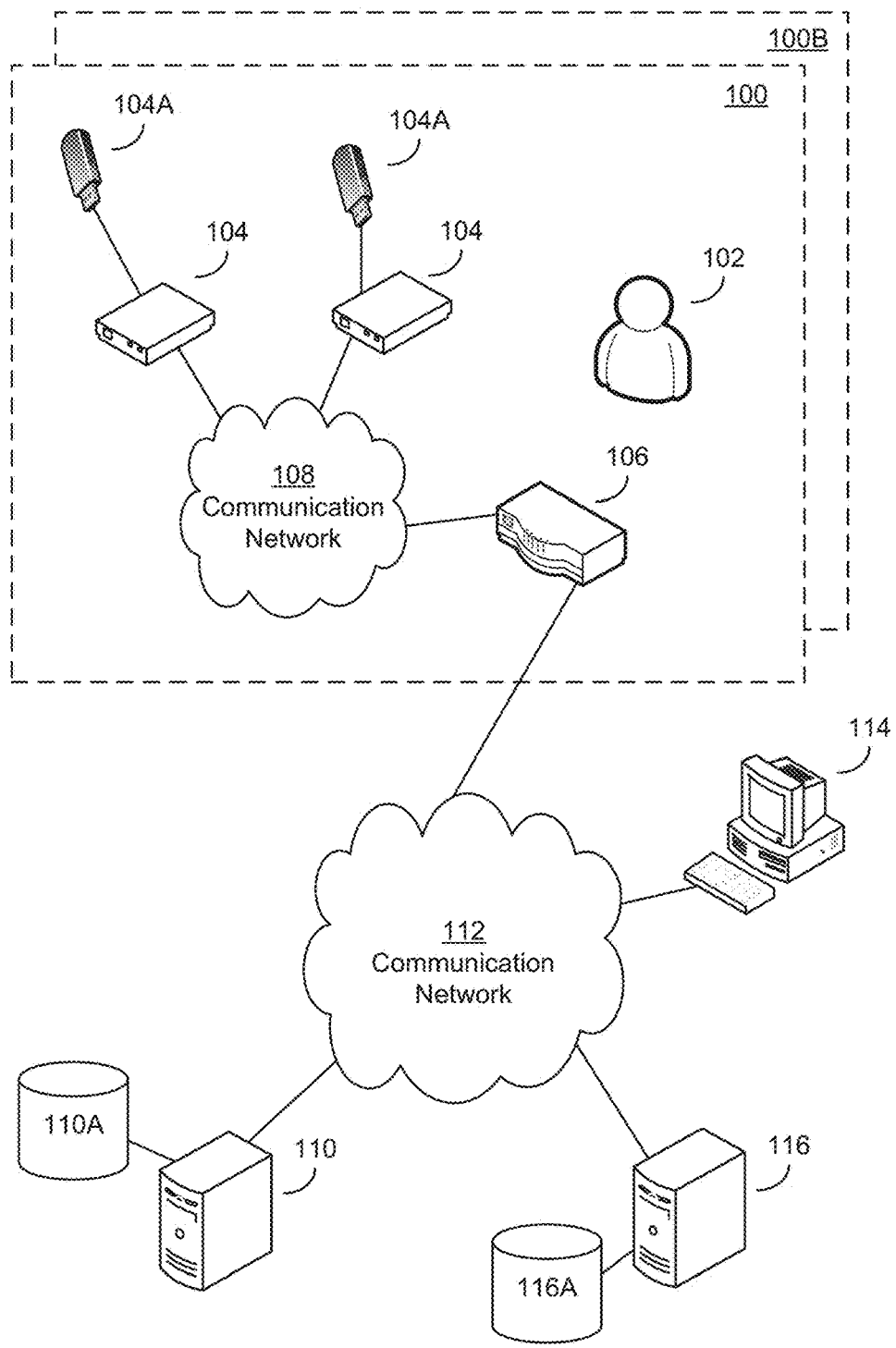
FIG. 1 is an illustration of an exemplary computer system with which some embodiments may operate.

Described herein are embodiments of a certification system for use with an environmental monitoring system that monitors environmental parameters of multiple different environments, where each environment is owned and/or managed by an operator of the environment. Each environment may include one or more environmental sensor units each including one or more sensors that may detect values of one or more environmental parameters and report the values to one or more servers of the environmental monitoring system. At least some of the sensors in a first environment operated by a first operator may be certified in accordance with standards set by a standards-setting body, such as NIST. The certification system, which includes one or more computing devices, monitors the certification of environmental sensors of the system. When the certification system detects that the certification of a sensor in the first environment satisfies a condition, such as that the certification is to expire within a threshold period of time, the system triggers the distribution of a certified sensor to the first operator to replace the sensor for which the certification is to expire. For example, the system may send to the first operator of the first environment a replacement sensor that has been certified. The system may trigger the certification of a new sensor of a same sensor type as the sensor for which a certification is to expire, and may trigger the environmental monitoring system to send the newly-certified sensor to the first operator of the first environment. Alternatively, the system may trigger distribution of a previously-certified sensor or a sensor that has a valid certification, without needing to trigger a new certification. In cases in which the environmental monitoring system includes a store of data previously collected by a sensor for which the certification is expiring, the certification system may also configure the environmental monitoring system with information regarding a new sensor that is to replace the sensor for which certification is expiring. The environmental monitoring system may associate the replacement sensor with the sensor for which the certification is expiring and/or associate the replacement sensor with a task that was being performed by the sensor for which the certification is expiring. For example, the system may have associated with the sensor for which the certificate is expiring with a task such as monitoring a particular location, monitoring a particular environmental parameter, and/or monitoring in a particular manner such as at a specified interval. The system may associate the replacement sensor with the location, parameter, and/or manner of the sensor for which the certification is expiring, or otherwise associate the replacement sensor with a task that was being performed by the sensor for which the certification is expiring. For example, during a registration process for the replacement sensor, the system may register the replacement sensor using data that was associated with the sensor for which the certification is expiring, such as information characterizing the task that was being performed by the sensor for which the certification was expiring or with which the sensor was configured. By doing so, in some embodiments, the history of data collected by the previously-certified sensor (and, in some cases, by other sensors that were in turn previously replaced by that sensor) may be associated with the replacement sensor to provide a continuity of data for the environment being monitored, despite the replacement of sensors.

In some embodiments, the certification system may also monitor whether the sensor to be replaced has been returned by the first operator to the environmental monitoring system and may recertify the sensor and distribute the recertified sensor to another operator of another environment.

In some embodiments, the certification system may also electronically store records regarding the certification of sensors that have been certified by the system. For example, the certification system may generate a report on the certification that includes identifying information for the sensor, information on the manner in which the certification was completed, and the expiration date of the certification. The report may be stored in any suitable manner, including as an electronic representation of a conventional paper certificate. As a specific example, the certification system may generate a certificate in a Portable Document Format (PDF) format that includes the information on the sensor and the certification and includes text formatting information and/or information identifying one or more ornamental graphics. The system may store the report in a web-accessible location. In some embodiments in which the report is generated and stored in a web-accessible location, the certification system may also generate a label to be applied to the sensor that includes identifying information for the sensor and/or for the web-accessible location. For example, the label may include a serial number for the sensor and a universal resource locator (URL) for the web-accessible location. The label, once generated, may be applied to a certified sensor, such as before the sensor is distributed to an operator of an environment in which the sensor is to be used.

The inventor has recognized and appreciated that such a system may overcome disadvantages of some conventional systems. For some environments, an environmental monitoring system may have dozens, hundreds, or more sensors that may be densely distributed in a complex manufacturing facility or even distributed across a wide geographic area like a farm. The certificate for each sensor of the system is conventionally printed on paper that is separate from the sensor to which it relates and may be maintained in a filing cabinet of the operator of the environment. Keeping the records organized for large sensor systems, including correctly relating certificates to sensors so as to track certification status for each of the multiple sensors, may be an arduous process that renders compliance with standards burdensome for operators of these environments. Further, the recertification or replacement of sensors may be a process that is costly in time and/or money. In some conventional processes, a sensor must be removed from an environment and sent to a certification provider for recertification, which may be difficult for an operator of an environment. During that time, it may be difficult to operate the environment or equipment in the environment while complying with the standards, since the sensor is not disposed in the environment. In other processes, a certification technician may visit an environment to recertify processes on-site, which may be easier for an operator of the environment but is often more expensive.

The inventor has further recognized and appreciated that conventional processes create discontinuities in the data collected by sensors for an environment. Conventionally, when a new sensor is placed into an environment following expiration of the certification of a sensor, the two sensors are treated as completely independent of one another. The inventor has recognized that this process creates difficulties for audits that may be conducted of environmental monitoring systems that typically review environmental data over an extended period of time. When a certification of a sensor expires during the period of time and a new sensor is inserted, conventionally this created two independent streams of data that must be maintained and, during an audit, collected and then aligned in some manner to identify the changes in an environmental parameter over the whole period of time for which the audit is to be conducted. Such a process requires detailed record-keeping and is administratively arduous. The difficulties in such a process created difficulties in properly performing audits, which in turn created difficulties for certifying proper operation of an environmental monitoring system as a whole or proper operation of an environment to be monitored.

Various embodiments described herein may overcome at least some of these disadvantages. Examples of embodiments are described below, but it should be appreciated that embodiments are not limited to operating in accordance with any of the specific examples, as other embodiments are possible.

FIG. 1 illustrates an example of a computer system with which some embodiments may operate. The computer system of FIG. 1 includes an environment 100 for which an environmental monitoring system may monitor one or more environmental parameters. In some embodiments, the environmental monitoring system may monitor environmental parameters for multiple environments, including by maintaining an account for multiple different operators that are each customers of the environmental monitoring system and that each own and/or manage one or more environments. FIG. 1 therefore illustrates environment 100 as well as one or more other environments 100B.

It should be appreciated that embodiments are not limited to operating with any particular type of environment nor limited to operating with any particular type of monitoring equipment, as monitoring equipment may vary in type or number or in the kind of environmental parameter monitored depending on the type of environment. As one example, an environment may be a restaurant and monitoring equipment may include sensors for monitoring temperature, such as temperature of food storage facilities such as freezers and refrigerators. As another example, an environment may be a pharmaceutical manufacturing facility and monitoring equipment may include sensors for monitoring humidity, atmospheric pressure, temperature, for the presence of dust, for the presence of one or more chemicals in the air that may affect health and/or manufacturing, and/or for any of various other conditions that may affect a manufacturing process.

FIG. 1 illustrates an example of an environment and environmental monitoring equipment that may be used in connection some environments. As shown in FIG. 1, environment 100 is associated with an operator 102, which may be a human or entity that owns and/or manages, or otherwise operates, environment 100. Environment 100 may include one or more environmental sensor units 104, each of which may include one or more environmental sensors 104. The environmental sensor units 104 may communicate with a base station 106 (which may also be configured to act as an environmental sensor unit and which may include one or more environmental sensors) via a communication network 108. Network 108 may be any suitable one or more wired and/or wireless networks including a wireless personal area network (WPAN) such as a ZIGBEE® network, a wireless local area network (WLAN) such as IEEE 802.11, a wireless wide area network (WWAN) such as a cellular network, or any other network.

Environmental sensor units 104 and base station 106 may be arranged and operate in any suitable manner to monitor one or more environmental parameters of the environment 100. For example, the units 104 and base station 106 may be implemented in accordance with exemplary devices and techniques described in U.S. patent application Ser. No. 12/275,935 filed on Nov. 21, 2008 ("the '935 application"), Ser. No. 12/275,971 filed on Nov. 21, 2008 ("the '971 application"), Ser. No. 13/340,051 filed on Dec. 29, 2011 ("the '051 application"), and/or Ser. No. 13/474,372 filed on May 17, 2012 ("the '372 application"), 61/897,535 filed on Oct. 30, 2013 ("the '535 application"), and Ser. No. 14/180, 791 filed on Feb. 14, 2014 ("the '791 application"). Each of these prior applications is incorporated herein by reference in their entireties and at least for their discussion of techniques of operating environmental monitoring systems and environmental sensor units and base stations of such systems. Any terminology that is used herein in a manner that conflicts with the use of that terminology in any of these prior applications should be afforded a meaning most consistent with its use herein.

In some embodiments an environmental sensor unit 104 may include one or more sensors 104A, each of which may be integrated with the environmental sensor unit 104 or communicating via a wired and/or wireless connection with the environmental sensor unit 104 (and/or with a base station 106, which may act as an environmental sensor unit). The sensors 104A may collect data on one or more environmental parameters of the environment, including on how the environmental parameters change over time. In some cases, the environmental sensor unit 104 may perform processing on raw values collected by a sensor 104A, which may be any suitable processing as embodiments are not limited in this respect.

A unit 104 may have been paired, either manually or through an automatic pairing process (such as the pairing processes described in the '372 application), with a base station 106. The unit 104 may transmit raw data and/or processed data regarding environmental parameters to the base station 106 via the network 108. The base station 106 may collect data from one or more sensor units 104 in the environment and may transmit data regarding environmental parameters to one or more servers of an environmental monitoring system that are located remote from the environment 100. The communications between the sensor units 104 and the base station 106, and the base station 106 and the servers remote from the environment, may be in any suitable format and in accordance with any suitable protocol, as embodiments are not limited in this respect. In some embodiments, the communications may be formatted according to stateless and/or best effort communication protocols, such as protocols described in the '935 application, the '971 application, and the '372 application.

In some embodiments, when data collected by one or more sensor unit(s) is transmitted to a server, the data may be transmitted in a message that identifies the sensor that collected the data. In some embodiments that associate sensors with tasks performed by those sensors, such as parameters and/or locations monitored by those sensors, the message may additionally identify the task that was being performed by the sensor and to which the data relates. The task may be identified in any suitable manner, including via an identifier such as an alphanumeric identifier that includes alphabetic characters and/or numeric characters.

FIG. 1 illustrates a server 110 (which may be one or more servers, or one or more of any other type of computing device) that may be included in an environmental monitoring system and that may include a data store 110A. The server 110 may execute an environmental monitoring facility that receives and processes data from sensor units 104 located in environment 100 and other sensor units located in the environment(s) 100B. The environmental monitoring facility on the server 110 may process the data in any suitable manner, including in accordance with techniques described in the '935 and '971 applications or any of the other prior applications. For example, the data store 110A may include an account for each operator that is a customer of the environmental monitoring system.

The data stored in data store 110A for an account of an operator may specify alarm conditions and alert actions to be taken when an alarm condition is met. The environmental monitoring facility may receive data regarding environmental parameters from environmental sensor units and store the data in the data store 110A in association with the account of the operator of the environment to which the data relates. In some embodiments, as discussed in more detail below, the facility may store data regarding environmental parameters in accordance with information identifying a sensor that produced the data and/or a task performed by the sensor. As discussed below, in some embodiments, by associating sensor(s) and data with a task, in a case that a sensor is replaced, a new sensor may be associated with the task and related data may be identified. Though, in other embodiments, the environmental monitoring facility may not store information regarding tasks or associate sensors or data with tasks, but instead may associate sensors with one another in a data store to relate data, as described below.

The environmental monitoring facility may additionally evaluate newly-received data alone and/or together with previously-received data to determine whether one or more alarm conditions are met, such as by determining whether a temperature in an area is outside an acceptable range or is changing too rapidly. When the facility determines that the data satisfies the alarm condition(s), the facility may take one of the alert actions, such as by placing a phone call or sending an email or text message to the operator.

The environmental monitoring system may further include a user interface by which information regarding an account of an operator, including information on current or previous values of environmental parameters, may be viewed by an operator or others. In some embodiments, the user interface may be viewable on a computing device 114, such as a desktop or laptop personal computer, a smart phone, or any other computing device. The user interface may be implemented in any suitable manner, as embodiments are not limited in this respect. In some embodiments, for example, the user interface may be implemented as a set of one or more web pages that may be stored in data store 110A and that may be downloaded by the computing device 114 and displayed to a user. Examples of user interfaces are described in the '935, '971, and '051 applications.

As should be appreciated from the foregoing, some embodiments may additionally include a certification system for use with the environmental monitoring system that includes the server 110 and the sensors 104A, the sensor units 104, and base station 106. In these embodiments, an operator may desire or be required (by industry practice, government regulation, or any other reason) to certify the proper operating performance of environmental sensors deployed in an environment. For example, the sensors may be certified as compliant with standards for sensors set by a standards-setting body, which may be an industry body or a government body such as the U.S. National Institute of Standards and Technology (NIST). Any suitable standards set by any suitable entity may be used, as embodiments are not limited in this respect. In some such embodiments, the certification system may manage the certification of the sensors in the environment and assist the operator with ensuring that, before the expiration of a certification of a sensor, a newly-certified sensor is available and installed in the environment to replace the sensor for which certification is to expire.

FIG. 1 illustrates a server 116 that may implement a certification facility and maintain a data store 116A to manage certifications of one or more environmental sensors of one or more environments. Server 116 may be implemented as a set of one or more servers, or as one or more of any other type of computing device, as embodiments are not limited in this respect. Additionally, while FIG. 1 illustrates server 116 and its data store 116A separate from server 110 and data store 110A, in some embodiments the server and data store of the certification system may be implemented on the same server(s) 110 and data store 110A.

The certification facility may implement techniques described herein for managing certifications of one or more sensors of one or more environments. Examples of techniques that may be implemented by a certification facility, or an environmental monitoring facility implementing certification techniques or operating in conjunction with a certification facility, are described below in connection with FIGS. 2-9. It should be appreciated, however, that embodiments are not limited to implementing a certification facility that operates in accordance with any of the illustrative examples of FIGS. 2-9, as other implementations are possible.

For ease of description, in each of the examples below a certification management process will be described in connection with an environmental sensor, which may be more simply referred to at times as a "sensor." It should be appreciated, however, that embodiments may manage certifications of proper operation of environmental sensors that are implemented in any suitable manner and are not limited to certifying the proper operation of a device that is only an environmental sensor. For example, in some embodiments a certification system may manage certifications of environmental sensors that may be connected via a wired and/or wireless connection to environmental sensor units or base stations. In other embodiments, a certification system may additionally or alternatively manage certifications of environmental sensors that are integrated with environmental sensor units and/or base stations. In still other embodiments, a certification system may additionally or alternatively manage certifications of environmental sensors that are implemented with other devices. Thus, references made below to "sensors," or triggering certification or distribution of "sensors," should be understood to equally apply to environmental sensors, to environmental sensor units and base stations that include environmental sensors that are integrated and/or connected via wired and/or wireless connections, or to other devices that include environmental sensors.

Figure 2:
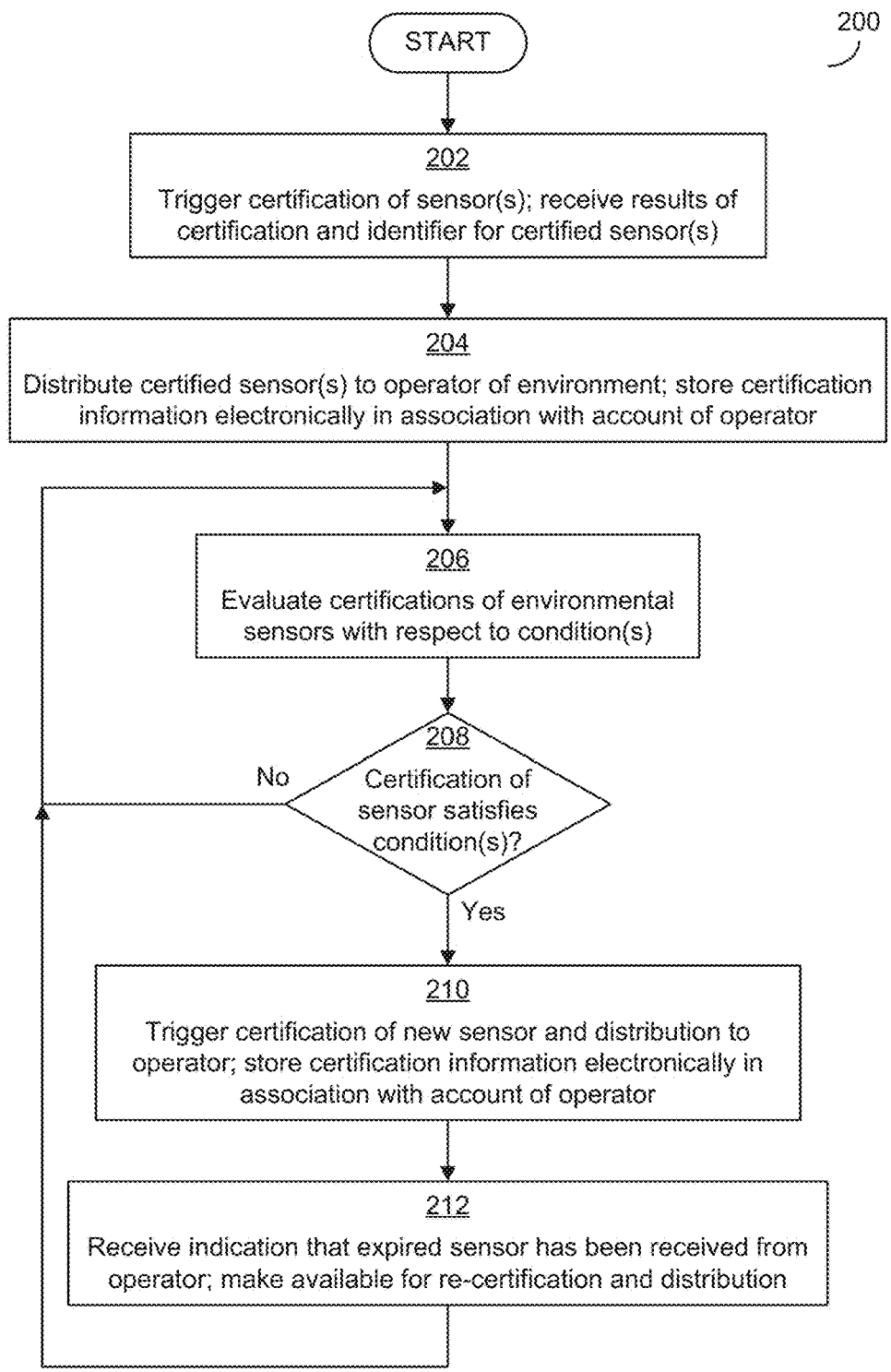
FIG. 2 is an example of a process that may be implemented in some embodiments by a certification facility for managing certifications of one or more sensors.

FIG. 2 illustrates one example of a process that may be implemented by a certification facility to manage certification of sensors installed in one or more environments. Prior to the start of the process 200 of FIG. 2, one or more operators of environments may become customers of an environmental monitoring service and register accounts with that service. The environmental monitoring service may distribute one or more sensors to each operator and the operator may install the sensors in the environments. The sensors that have been distributed to the operators may be registered, either manually by the environmental monitoring service and/or by the operators of the environments including using techniques described in the '935 or '971 applications, or automatically using techniques described in the '372 application. In some embodiments that store data regarding environmental parameters in association with tasks performed by sensor units, the task(s) with which each sensor unit are associated may be set during registration of the sensor units. For example, information regarding a location that is to be monitored (e.g., an environment, or a portion of an environment) and/or an environmental parameter that is to be monitored, may be stored in a data store in association with a sensor unit.

The process 200 implemented by the certification facility begins in block 202, in which the certification facility triggers the certification of one or more sensors. The certification facility may trigger the certification in block 202 in response to any suitable conditions, as embodiments are not limited in this respect. For example, in some embodiments the certification facility may receive an indication from a sales or order management system that an operator has purchased or otherwise requested a certified sensor and, in response to the purchase/request the certification system may trigger certification of a sensor. The certification facility may, in some cases, retrieve information regarding the certification to be performed and include that information in the triggering. For example, the certification facility may determine a standard or set of standards against which a sensor is to be certified. The certification facility may determine the information in any suitable manner, including by retrieving the information from a data store of the environmental monitoring system and/or certification system that stores information regarding the operator of the environment for which the sensor is to be certified. For example, an operator may input via a user interface of the environmental monitoring system and/or certification system information regarding a standard or set of standards to be used in certifying standards for that operator, and this information may be retrieved by the certification facility and provided when the certification is to be triggered.

The facility may trigger the certification in any suitable manner. For example, the facility may output a message to a user (e.g., a certification technician of the environmental monitoring service, or another user), such as by outputting a message for display, displaying a message, or transmitting an email, text message, or voice message. The message may include any suitable information regarding the certification to be performed. For example, the message may indicate that a sensor is to be certified. As another example, the message may indicate that a sensor of a particular type is to be certified. As still another example, the message may additionally or alternatively indicate the standards against which the sensor is to be certified, which may be useful in embodiments in which a certification system operates with multiple different sets of certifications.

While in some embodiments the certification facility may merely output a message indicating that a certification is to be performed, in other embodiments the certification facility may additionally or alternatively certify a sensor in block 202. In such embodiments, the certification facility may implement known techniques for certification of proper operating performance of a sensor. For example, the certification facility may operate a test environment to sense environmental parameters under different conditions, such as by testing a temperature sensor at different temperatures. A reference sensor that is known to operate properly may also be installed in the environment and outputs of the sensor under test may be compared to outputs of the reference sensor to determine whether the sensor under test is operating within acceptable tolerances. If so, the sensor under test is certified. If not, the sensor under test is rejected and another sensor may be tested in the same manner until proper operating performance of a sensor can be confirmed. The certification may be performed automatically by a certification facility or with human assistance, such as via humans placing sensors in a test environment, though it should be appreciated that embodiments are not limited to performing certification in any particular manner.

In block 202, following triggering of the certification (and, in some embodiments, following the certifying), the certification facility receives results of the certification and an identification of the sensor(s) for which proper operating performance has been certified. For example, the certification facility may receive information regarding a performance of the sensor during the test, such as the particular values output by the sensor under the different conditions under which the sensor was tested as well as an indication of the different conditions at which the sensor was tested. The certification facility may in some cases receive an identification of the standard against which the sensor was certified, such as an identification of the body that set the standard or a name, version, and/or other identifier for the standard.

The certification facility may receive an expiration date for the certification of the sensor, which may be any suitable amount of time (e.g., several months, a year, multiple years) from the date of the certification. The amount of time from certification until expiration may vary between standards, types of sensors, types of environmental conditions, or based on any other suitable factor. The expiration date may be received in any suitable manner, including as a particular date of expiration or as an identifier of the date of certification and an indication of an amount of time from certification until expiration.

In block 204, the certification facility triggers distribution of the certified sensor(s) to one or more operators of one or more environments that are customers of an environmental monitoring system. For example, the facility may trigger registration of the sensors to the operators of the environments, such as by instructing that information regarding the sensors may be stored in a data store of the environmental monitoring system in connection with an account of the operators. The certification facility may also trigger delivery (e.g., by shipping) of the sensors to the operators, such as by outputting a message to a user identifying an operator to which a sensor should be delivered or by instructing a sales or order management system to process an order for delivering the sensor to the operator. The message output to a user or to a sales/order management system may, in some cases, identify a particular certified sensor to be distributed, such as by identifying a certified sensor by serial number. In addition, in block 204, the certification facility may store the certification information for each certified and distributed sensor in a data store accessible by the certification facility (which may be a data store storing information for the environmental monitoring system, including on accounts of customers, or another data store) in connection with information on the sensor and the operator to which the sensor was distributed. For example, the certification facility may store the information on the type of sensor, the serial number of the sensor, the performance of the sensor during certification, the standard against which the sensor was certified, and an expiration date of the certification.

After the certified sensor(s) have been distributed to the operator(s) over time, the certification facility in block 206 evaluates the certifications of the sensors to determine whether one or more conditions have been met, where the conditions indicate whether action regarding a sensor may be required. The conditions may relate to certification of the sensor, including whether a certification is to expire soon. Any suitable condition may be used, as embodiments are not limited in this respect. For example, in some embodiments the certification facility may evaluate expiration dates of the sensors to determine whether an expiration date of any particular sensor is within a threshold time of a current time. As another example, the certification facility may additionally or alternatively determine whether a sensor was certified using a standard that has changed since the certification (e.g., a new version of the standard has been issued) such that the certification of the sensor should be considered outdated. As another example, if it is determined that certification test equipment was operating improperly at a time or certifications of sensors that were performed during a time period or under certain conditions are otherwise questionable, the certification facility may determine whether the certification of a particular sensor was performed during that time or otherwise under those conditions. Under any of these exemplary conditions or other conditions, the condition(s) evaluated by the certification facility may determine in block 206 may be conditions with which the facility is preprogrammed or hardcoded and evaluate repeatedly over a period of time, or may be conditions that are input dynamically by a user and that are evaluated by the certification facility in response to the user's query.

If the certification facility determines in block 208 that the condition(s) are not met by the certifications of any sensors, then the certification facility loops back to continue evaluating the conditions and certifications in block 206. If, however, the certification facility determines in block 208 that the certification of one sensor meets the conditions, the certification facility determines that this sensor (for simplicity, referred to below as the "old sensor") should be replaced by a newly-certified sensor (for simplicity, referred to below as the "new sensor").

Accordingly, in response the certification facility in block 210 triggers the certification of a new sensor and distribution of this new sensor. In particular, the certification facility determines from the data store the operator with which the old sensor is associated (i.e., the operator to which the old sensor was distributed and in whose environment the old sensor is installed) and triggers distribution of a new sensor to that operator. The facility may trigger the certification and distribution in any suitable manner, including according to techniques discussed above in connection with blocks 202 and 204. The certification facility may trigger certification of a new sensor that is of a same sensor type as the old sensor. The certification facility may also trigger the certification to be performed under the same standard as the certification of the old sensor, including under a new version of the same standard as the certification of the old sensor. Following the certification of the new sensor, the certification facility may store information regarding the new sensor and the certification of the new sensor, including the types of information described above in connection with block 204.

In some embodiments, after a new sensor is distributed to an operator, the operator may be expected to return the old sensor. In some cases, this may be done because the old sensor may be expected to be working properly and, following re-certification, may be able to be distributed again to the operator or to another operator. Accordingly, the certification facility may await an indication that the operator has returned the old sensor. In block 212, the certification facility may receive an indication that the old sensor has been received by the environmental monitoring system and/or the certification system, which may be an input received from a user or any other suitable input. In response to receiving the indication, in block 212 the certification facility may store information indicating that the old sensor is available for re-certification and redistribution. Any suitable information may be stored in block 212, as embodiments are not limited in this respect. In some embodiments, the certification facility may store an identifier for the sensor, such as a serial number, and an indication that the sensor is available for recertification and redistribution.

Once the old sensor is received and the information stored in block 212, the certification facility loops back to block 206 to continue evaluating certifications of sensor with respect to conditions.

As a result of the process 200 of FIG. 2, a certified sensor that was installed in an environment may be replaced with a newly-certified sensor prior to expiration of the certification or otherwise when the certification of the sensor meets one or more conditions. In some embodiments, the certification system may trigger the replacement of the sensor in this manner automatically, without any input from the operator of the environment, or without any request being received from the operator of the environment or, in some cases, without any input from an operator of the environmental management system or of the certification system. Accordingly, in some cases the operator may not even be aware of the status of the certification of the sensor to be replaced. Through such a certification system, an operator of an environment may be relieved of the burden of managing the certifications of sensors in the environment and ensuring that sensors for which certifications are to expire are replaced before expiration (or otherwise replaced when conditions are met).

While the example of FIG. 2 (and in other illustrative embodiments discussed below) described "triggering" certification of sensors, it should be appreciated that embodiments are not limited to performing certification dynamically in this manner. Rather, in some embodiments when a sensor is to be distributed to an operator or other party, rather than newly-certifying a sensor and distributing that newly-certified sensor, the service may distribute a previously-certified sensor. The previously-certified sensor may be, for example, a sensor that has not been used in an environment or for monitoring since certification. As another example, the sensor may be one that has a valid (e.g., not yet expired) certification and that may or may not have been used in an environment following certification. The previously-certified sensor may be distributed to an operator in the manner described in FIG. 2 above in connection with distribution of newly-certified sensors.

FIGS. 3-9 illustrate further details regarding some of the steps that may be included in the exemplary process 200 of FIG. 2.

Figure 3:
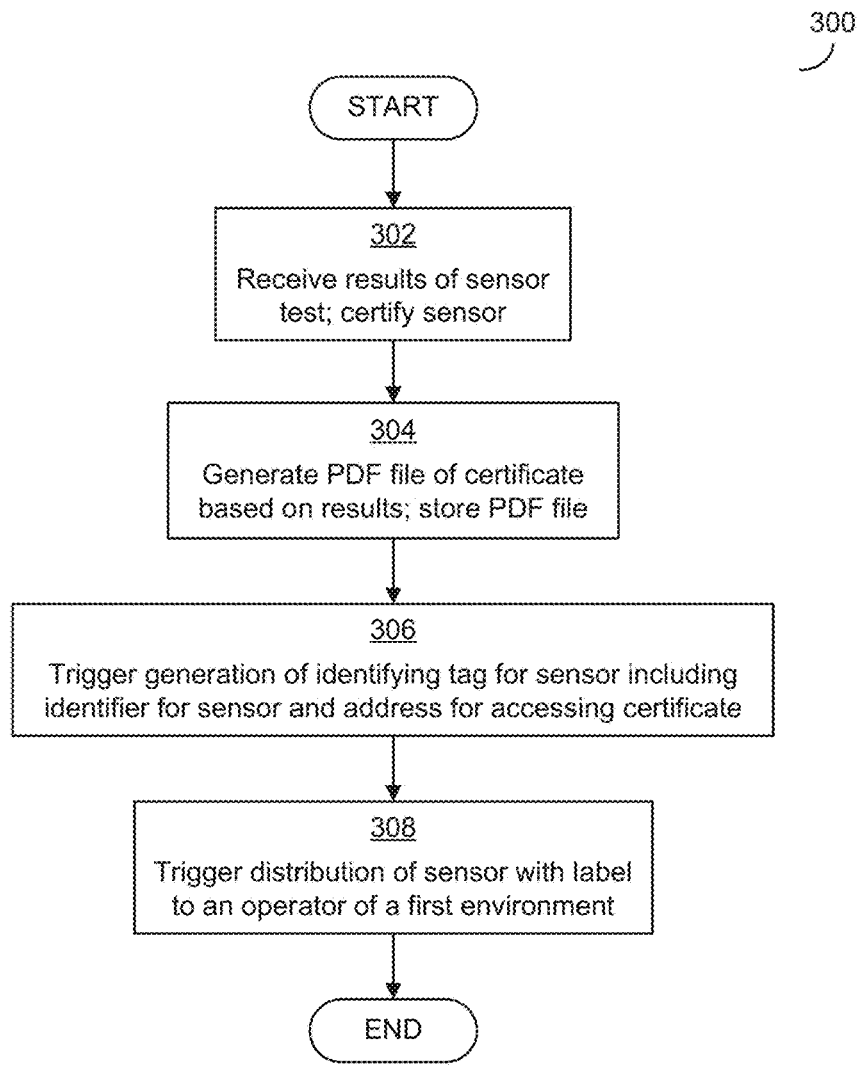
FIG. 3 is an example of a process that may be implemented in some embodiments by a certification facility for managing information relating to the certification of a sensor.

FIG. 3 illustrates an example of a process that a certification facility may implement to store information regarding certification of a sensor and to distribute a certified sensor to an operator of an environment. Prior to the start of the process 300, the certification facility may trigger certification of a sensor to be distributed to an operator, such as in response to receiving an indication that the operator has requested the sensor or in response to the certification system determining that a new sensor is to be distributed to replace a previously-certified sensor. The certification may then be performed, such as using any of the exemplary techniques described above in connection with FIG. 2.

The process 300 begins in block 302, in which the certification facility receives the results of a sensor test that was conducted pursuant to a certification. The information that is received in block 302 may be any suitable information regarding the test, the manner of certification, and/or the sensor, or any other suitable information relating to the certification process. Examples of such information are discussed above in connection with FIG. 2. In response to receipt of the information in block 302, the certification facility certifies the proper operating performance of the sensor.

In block 304, in response to certifying the proper operating performance, the certification facility generates a certificate for the sensor that is in an electronic format. The electronic format may be any suitable format, as embodiments are not limited in this respect. In some embodiments, the electronic format may be one to generate a display output that resembles a paper certificate. For example, the electronic format may store information regarding the certification, such as results of the testing, an identifier (e.g., serial number) of the sensor, and an expiration date of the certification, and may additional store information regarding one or more textual formatting options such as font or font size and regarding one or more graphic elements to be included in a display of the certificate in the electronic format. When the certificate is rendered for display, for example, a rendering program may read the electronic format and render certification information (e.g., the results of the test) in a font and font size set out by the textual formatting option information included in the electronic format and may additionally display graphic elements contained in and/or referenced by the electronic format. In some embodiments, the electronic format may be a Portable Document Format (PDF).

Once the electronic certificate is generated in block 304, the electronic certificate is stored by the certification facility in a data store of the certification facility. The electronic certificate may be stored in any suitable location, including in a publicly-accessible and/or web-accessible location. For example, in some embodiments, the certification facility may store the electronic certificate in a web-accessible location, such as a location that is publicly accessible by a public Uniform Resource Locator (URL) or other web address. As another example, in some embodiments, the certification facility may store the electronic certificate in a location that is accessible to a web server (but not necessarily publicly-accessible) and configure the web server to retrieve and output the electronic certificate in response to the web server receiving a request for the certificate, such as receiving a request specifying a particular web address (e.g., URL).

In block 306, the certification facility triggers generation of an identifying tag for the sensor that was certified in block 302. The certification facility may trigger the generation in any suitable manner. For example the facility may issue an instruction to a tag generating system, or may display a message to a user, or otherwise use any of the examples of triggering discussed above in connection with FIG. 2, including generating the identifying tag itself. The identifying tag may be any suitable type of tag that may be attached or applied to an interior or exterior surface of a sensor in a permanent, semi-permanent, or removable manner, as embodiments are not limited in this respect. In some embodiments, the identifying tag may be a label that may be attached to an exterior surface of a sensor using an adhesive, such as a label that is removably, semi-permanently, or permanently adhered to an exterior surface of a sensor. The identifying tag may include any suitable information. The identifying tag may include information relating to a certification of the sensor. For example, the identifying tag may include an identifier for the sensor such as a serial number and may additionally include a URL or other web address from which the electronic certificate related to the sensor may be retrieved for display.

In block 308, the certification facility triggers distribution of the certified sensor, together with the identifying tag, to the operator of the environment for which the sensor was certified. The triggering and/or the distribution may be performed in any suitable manner, including according to examples described above in connection with FIG. 2. Once the certification facility triggers the distribution in block 308, the process 300 ends.

As a result of the process 300, an electronic certificate corresponding to the certification of the sensor is stored in a data store of the certification facility and available for retrieval via the web. In addition, a label or other identifying tag that, in some embodiments, may be or has been affixed to the sensor may have been distributed with the sensor that includes a URL or other web address at which the electronic certificate is accessible. Such an electronic certificate, with or without the identifying tag, may ease a burden of an operator in managing an environmental monitoring system. For example, with some prior systems an operator may need to manage paper certificates for each sensor in a system, and somehow keep track of which paper certificate corresponds to which sensor. With a system that implements the process 300 of FIG. 3, however, the certificates may be stored on paper and a tag affixed to a sensor may be consulted to identify a web address that can be used to access the electronic certificate for that sensor.

Figure 4:
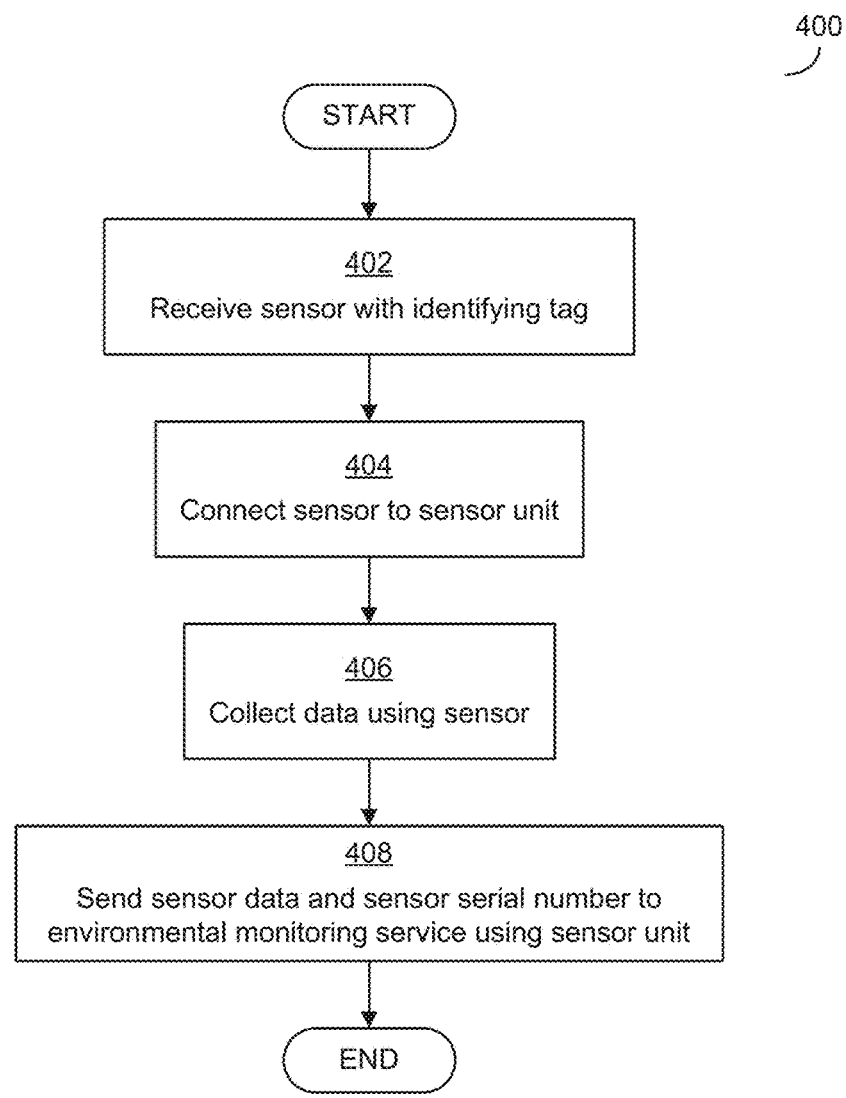
FIG. 4 is an example of a process that an operator may follow in some embodiments to monitor environmental parameters in an environment owned and/or managed by the operator.
Figure 5:
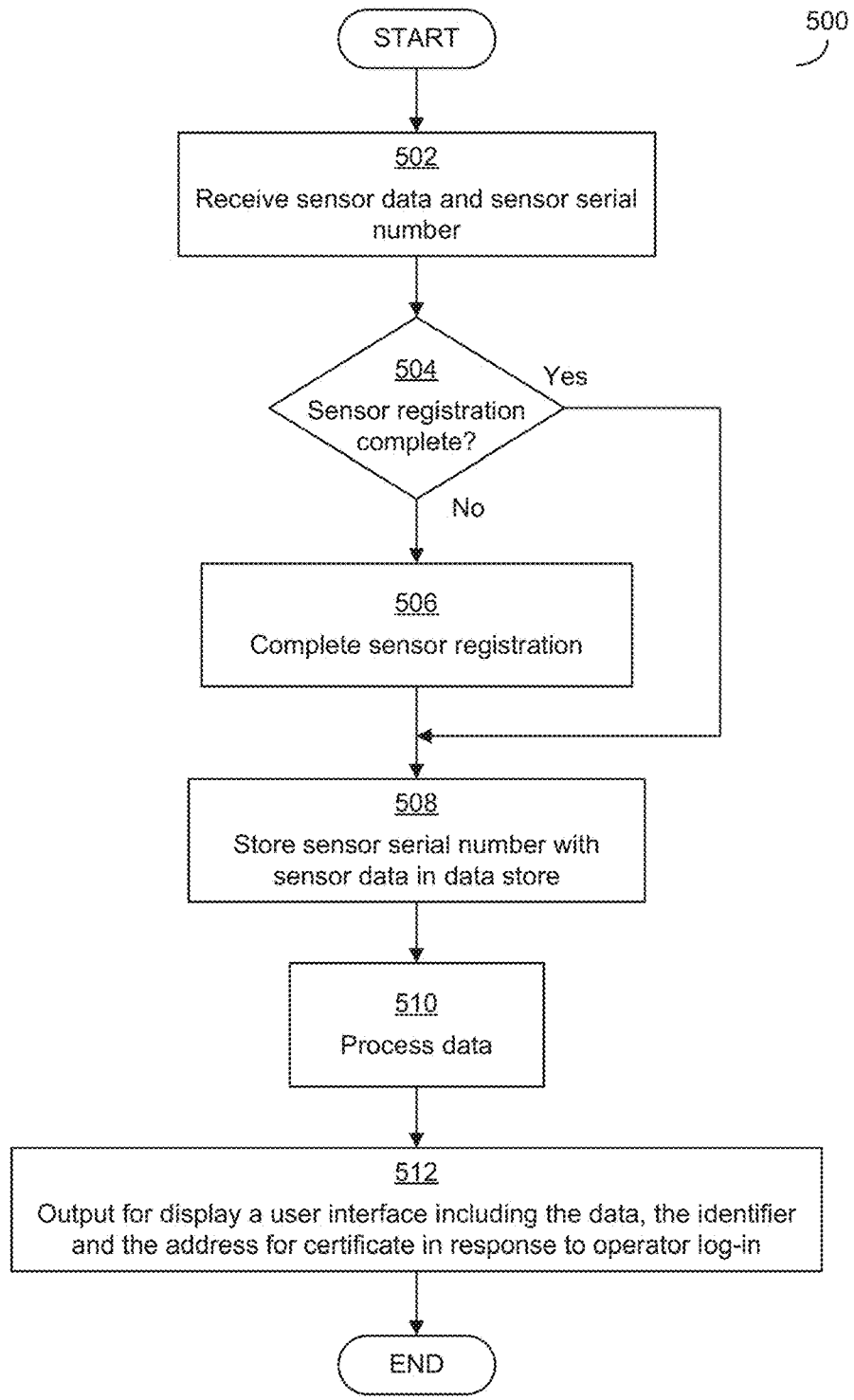
FIG. 5 is an example of a process that an environmental monitoring facility may implement in some embodiments to monitor one or more environmental parameters using one or more environmental parameters.
Figure 6:
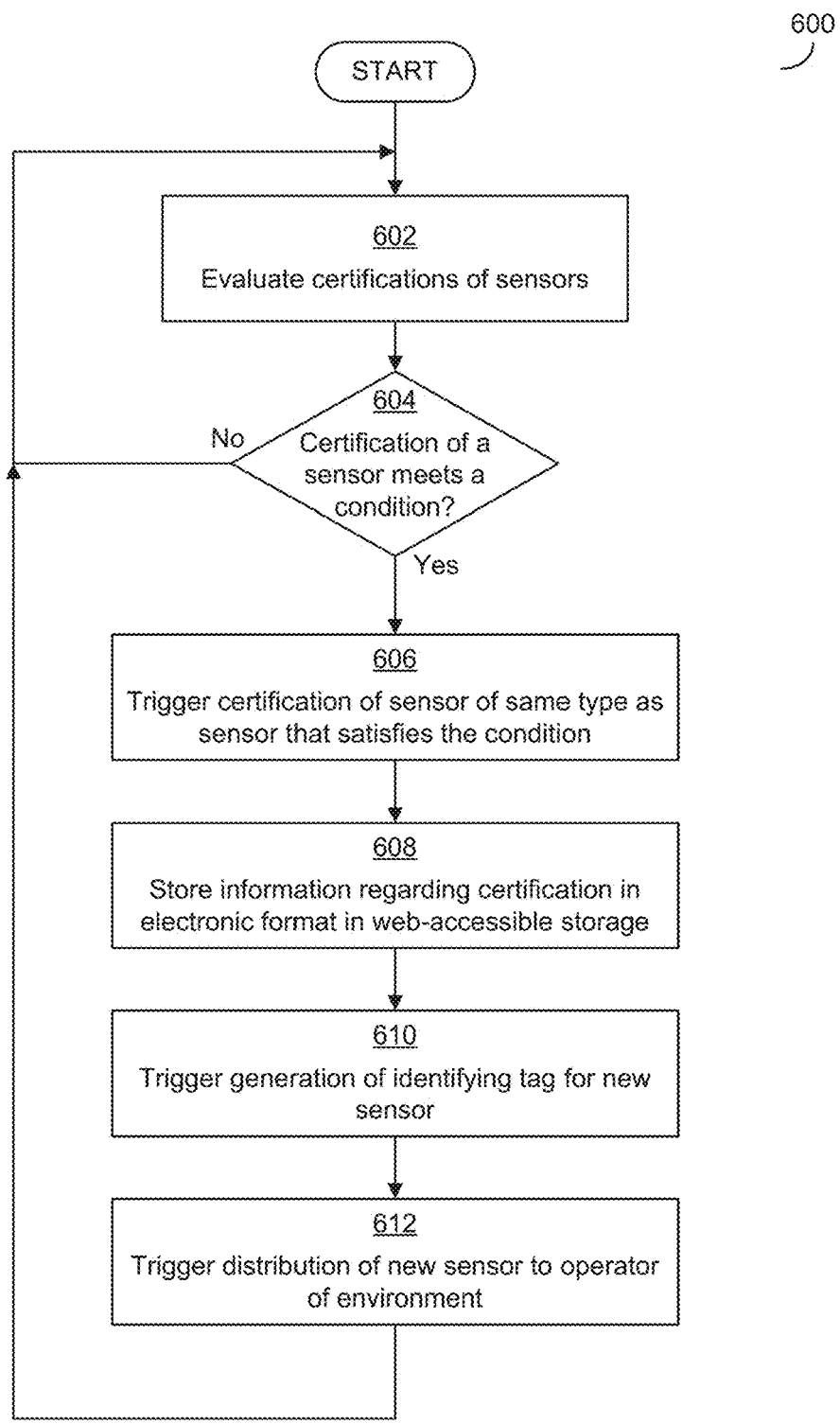
FIG. 6 is an example of a process that may be implemented in some embodiments by a certification facility to trigger certification and distribution of a new sensor in response to determining that a certification of an old sensor meets one or more conditions.

FIGS. 4-5 illustrates processes that may be implemented to monitor an environmental parameter using an environmental sensor of an environmental monitoring system. As discussed above, embodiments may implement any suitable technique, including techniques described in any of the applications referenced above and incorporated herein by reference. FIGS. 4-5 illustrates some steps of exemplary processes that may be used in some embodiments.

Prior to the start of the process 400, an environmental sensor may be certified and distributed to an operator, such as through the process 300 described above in connection with FIG. 3 or another process. The process 400 of FIG. 4 begins in block 402, in which an operator of an environment receives an environmental sensor, together with an identifying tag, that has been distributed to the operator by a certification system associated with an environmental monitoring system. The environmental sensor and tag may have been distributed in any suitable manner, including according to examples described above. The identifying tag may include any suitable information, including information related to a certification of the environmental sensor and/or a web address at which an electronic certification may be retrieved. The identifying tag may be affixed to the environmental sensor (e.g., an exterior surface of the sensor) or may be separate when the operator receives the sensor and tag. In cases in which the sensor and tag are separate, the operator may affix the tag to a surface of the sensor.

The operator then places the sensor in the environment at a location the operator desires to monitor and, in block 404, connects the environmental sensor to an environmental sensor unit. This may be performed in any suitable manner and may vary based on an implementation of the environmental sensor and environmental sensor unit. The connection may be established in accordance with techniques described in the '372 application. For example, the environmental sensor may be connected via a wire to a port of the environmental sensor unit.

In some embodiments, in block 404, the sensor unit may additionally be registered with the environmental monitoring service. In some other embodiments, the sensor may be registered prior to distribution to the operator. However, in some cases the sensor unit may be registered, automatically and/or manually, following installation of the sensor in the environment in block 404. In some embodiments discussed herein in which a sensor unit is associated with a task, the registration may include specifying the task that is to be performed by the sensor unit. Examples of a registration process are described below in connection with FIG. 5.

In block 406, data regarding an environmental parameter is collected using the environmental sensor and, in block 408, the data and information regarding the environmental sensor that originally collected the data is transmitted to one or more servers, remote from the environment of the operator, of the environmental monitoring system. The collection and transmission may be performed in any suitable manner, including using the techniques described in the '935 and '971 applications. Once the data is transmitted in block 408, the process 400 ends.

Prior to the start of the process 500, an environmental sensor may be certified and distributed to an operator of an environment, and installed in the environment by the operator, such as using the processes 300, 400 described above in connection with FIGS. 3-4. The sensor may be operated over time to collect sensor data, which may be transmitted to a server and handled each time data is received using a process like the process 500 of FIG. 5. Process 500 of FIG. 5 may be implemented by an environmental monitoring facility executing on one or more servers of an environmental monitoring system.

The process 500 begins in block 502, in which the environmental monitoring facility receives at least one message from an environmental sensor that includes sensor data regarding one or more environmental parameters and a serial number or other identifier for the environmental sensor that generated the data.

In block 504, in response to receiving the at least one message, the environmental monitoring facility determines whether the sensor from which the message was received is completely registered with the environmental monitoring system. If so, the facility continues to block 508.

If, however, the facility determines that the environmental sensor is not fully registered with the environmental monitoring system, then in block 506 the facility completes registration of the sensor. Registration may include any suitable steps, including storage of any suitable information, and embodiments are not limited to determining in any particular manner whether a sensor is completely registered or to taking any specific actions related to registration in block 506. In some embodiments, for example, the facility may determine in block 504 whether the environmental monitoring facility stores data identifying an environment in which the sensor is installed, or identifying an operator or account with which the sensor should be associated because the sensor is installed in an environment owned and/or managed by that operator. In such embodiments, if the facility determines that the system does not store data identifying an operator/account with which the sensor is associated, in block 506 the system may update a data store to indicate that the sensor is associated with an environment from which the at least one message was received. Further, in some embodiments in which information regarding a task performed by a sensor unit is stored in association with the sensor unit, the system may store information regarding the task in association with the sensor unit as part of registration. Any suitable registration techniques may be used, including registration techniques described in the '372 application.

In block 508, the environmental monitoring facility stores the data received in block 502, including the sensor readings and the serial number or other identifier for the environmental sensor, in a data store of the environmental monitoring system. In block 510, the facility may additionally process the data. Any suitable processing may be applied, as embodiments are not limited in this respect. In some embodiments, for example, raw data from a sensor may be transformed in some manner to provide information regarding an environmental parameter. As another example, in some embodiments one or more values of an environmental parameter may be compared to alarm conditions to determine whether the alarm conditions may be met and, if so, an alert may be issued. Any suitable alarm conditions may be used. In some cases, an alarm condition may be based on a single value of an environmental parameter produced by a sensor, such as by determining whether a reading is outside of an acceptable range. In other cases, an alarm condition may be based on a sequence of values of an environmental parameter over time, such as by determining whether a rate of change over a past amount of time is outside of a normal rate of change, or by determining whether a recent one or more readings demonstrate a pattern that varies from a pattern previously demonstrated by an environmental parameter. Accordingly, in block 510 the environmental monitoring facility may process the data received in block 502 alone or in association with data previously received from the environmental sensor. Results of processing may, in some cases, be stored in the data store, such as in cases in which data is transformed during the processing of block 510.

In block 512, in response to a log-in of the operator of the environment to a user interface of the environmental monitoring system, the environmental monitoring facility displays a user interface that includes data collected from the environmental sensor over time, the identifier (e.g., serial number) for the sensor, and a link at which an electronic certificate for the sensor can be retrieved. The user interface may be formatted in any suitable manner, as embodiments are not limited in this respect. For example, the user interface may be implemented as a set of one or more web pages. The user interface may include any suitable content formatted in any suitable manner, examples of which are described in connection with the '935, '971, and '051 applications. Once the user interface is output in block 512, the process 500 ends.

As a result of the processes 300, 400, 500 of FIGS. 3-5, a sensor may be certified and distributed to an operator of an environment, and the sensor may be used over time to collect data that is transmitted to and stored by an environmental monitoring system. In connection with techniques described herein, a certification system may evaluate certifications of sensors over time and, when a certification of a sensor satisfies one or more conditions, the certification system may trigger a process to replace that sensor with a newly-certified sensor. FIGS. 6-9 illustrate examples of processes that may be implemented in some embodiments as part of replacing an environmental sensor with a newly-certified sensor.

Accordingly, prior to the start of the process 600, the proper operating performance of one or more sensors is certified by a certification system and the sensors are distributed to operators of environments to be installed in the environments and monitor one or more environmental parameters of those environments. The certification system may also store in a data store information regarding the certification of the sensors, including on a manner of certification and/or an expiration date of the certification, or any of the other examples of information described above in connection with FIG. 2.

The process 600 begins in block 602, in which the certification facility evaluates the information stored in one or more data stores regarding the certifications of the sensors that have been previously certified to determine whether any of the certifications meet one or more conditions. The conditions may relate to expiration of a sensor unit's certification, and related to a time at which a sensor unit's certification is to expire. Any suitable conditions may be evaluated in block 602, as embodiments are not limited in this respect. Further, the conditions that are evaluated may be conditions that are preprogrammed into the certification facility, or hardcoded into the certification facility, or may be conditions that are input dynamically by a user such as part of a user query. As an example of a condition that may be evaluated in some embodiments, the certification facility may determine whether an expiration date of the certification of a sensor is within a threshold amount of time of a current time, such as within a threshold that may be between one day and three months of a current time, such as one week or one month. As another example, the certification facility may evaluate the certification to determine whether the certification was made for a particular standard, or version of a standard, that has changed since the certification such that certification may be out of date relative to a new iteration of the standard. Examples of other conditions that may be evaluated in block 602 are discussed above in connection with FIG. 2.

In block 604, based on the evaluation of block 602, the certification facility determines whether the one or more conditions are met. If not, the certification facility loops back to block 602 to continue evaluating certifications of sensors. If, however, the facility determines that one or more conditions is met by a certification of a particular sensor, then in response the certification facility in block 606 triggers a certification of a new sensor that is of a same type as the sensor for which the conditions were met. For example, if the old sensor for which the certification meets one or more conditions was a sensor to sense a particular environmental parameter, such as a temperature sensor, the certification facility may trigger the certification of a new sensor that also monitors that environmental parameter, such as a new temperature sensor. When the certification facility triggers the certification, it may trigger certification with respect to one or more standards. The standards against which the sensor is certified may be standards that have been configured by an operator of an environment, such as by the operator inputting the standard(s) into a user interface of the certification facility that are to be used in certifying sensors, which may include different standards for different types of sensors. In such cases, the certification facility may retrieve from a data store of the certification facility an identification of the standard(s) input by the operator that is applicable to the type of sensor to be certified. The certification facility may trigger the certification in block 606 in any suitable manner, including by outputting a message or instruction regarding the certification to be performed, or by certifying the sensor.

In block 608, following the triggering of block 606 and following the certification, the certification facility electronically stores information on the certification, such as any of the exemplary types of information described above in connection with FIGS. 2-3. The information may be stored in any suitable manner, including in an electronic format as discussed above in connection with FIG. 3. The information may be stored in any suitable storage, including at a location in a data store that is web-accessible. In block 610, the certification facility additionally triggers generation of an identifying tag for the sensor, such as an identifying tag of the type discussed above in connection with FIG. 3 and, in block 612, triggers distribution of the newly-certified sensor to the operator of the environment together with the identifying tag. After the certification facility triggers the distribution in block 612, the process 600 ends.

Figure 7:
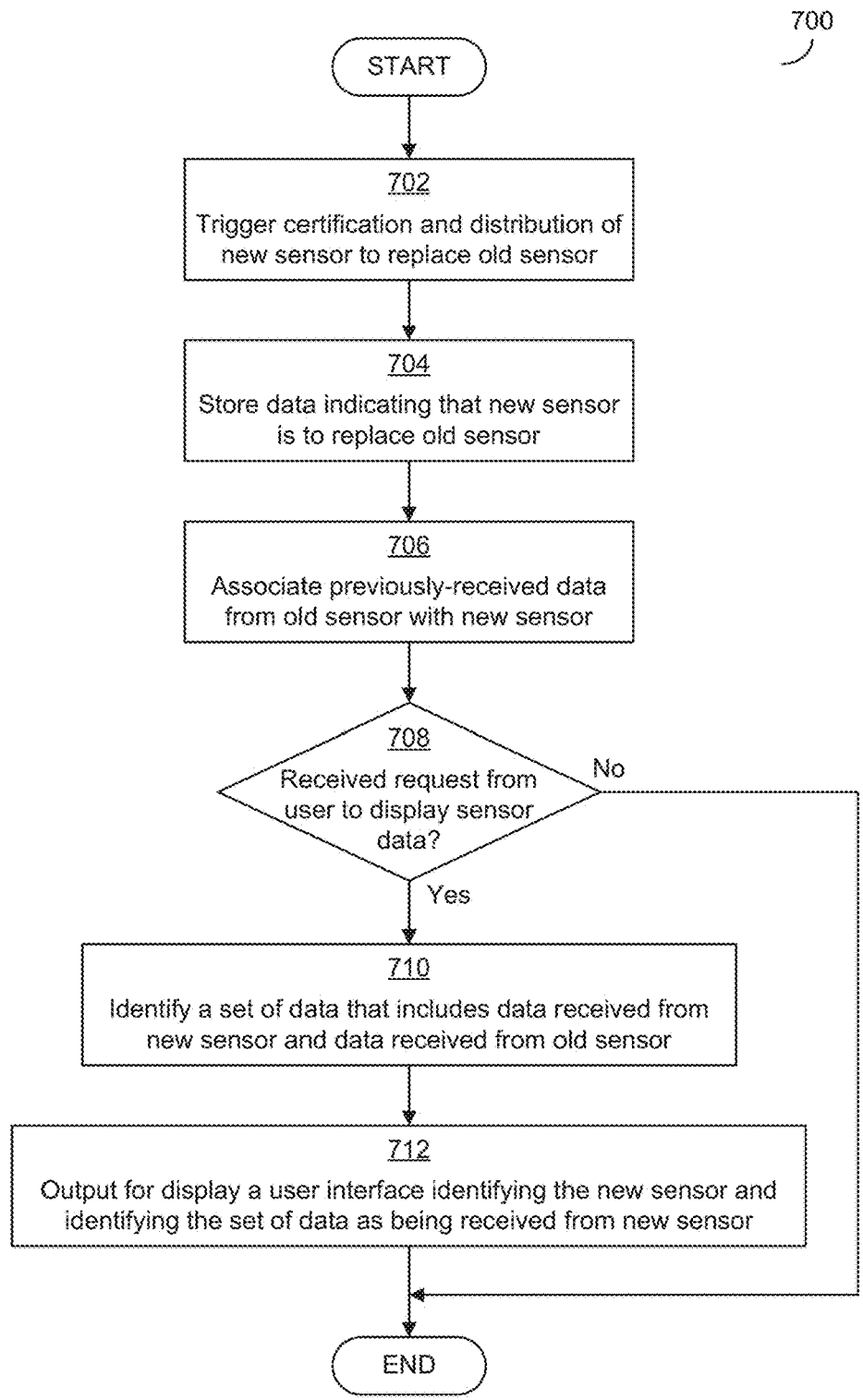
FIG. 7 is an example of a process that may be implemented in some embodiments by a certification facility to manage a replacement of an old sensor with a new sensor.

FIG. 7 illustrates additional steps that may be implemented by a certification facility in some embodiments. The process 700 of FIG. 7 may be implemented by the certification facility for execution in response to a determination that a certification of a sensor satisfies one or more conditions. For example, the certification facility may carry out the process 700 in response to a determination such as the one of block 604 of FIG. 6. Accordingly, prior to the start of the process 700 of FIG. 7, one or more sensors may be certified and distributed to operators of environments and a certification facility may store information on the certifications of the sensors. Additionally, a certification facility may determine that the certification of a sensor meets one or more conditions.

The process 700 begins in block 702, in which the certification facility triggers certification of a new sensor to replace an old sensor that is installed in an environment and for which the certification was determined to meet one or more conditions, and triggers distribution of that new sensor to an operator of that environment. The triggering of the certification and distribution of block 702 may be carried out in any suitable manner, including according to examples discussed above.

In block 704, the certification facility stores data in one or more data stores indicating that the newly-certified sensor (more simply referred to as the "new sensor" below) is to replace the sensor for which the certification met one or more conditions (more simply referred to as the "old sensor") below. The certification facility may store the data in any suitable data store, including a data store associated with the certification facility and/or a data store associated with an environmental monitoring system. Any suitable information may be stored in block 704, as embodiments are not limited in this respect. For example, in some embodiments, an identifier for the old sensor and an identifier for the new sensor, such as serial numbers for the sensors, may be stored together with an indication that the new sensor is to replace the old sensor.

The certification facility may, in some embodiments, take additional action to configure an environmental monitoring system with a new sensor that is to replace an old sensor. In some cases, a sensor installed in an environment may collect data regarding one or more environmental parameters over time and that history of environmental parameters may be used by the environmental monitoring system. For example, the system may produce as output in a user interface of the environmental monitoring system a graph or other representation of the data over a time period. As another example, the system may analyze the data collected over a time period to determine historical information such as a pattern demonstrated by the data, or statistical values such as averages or rates of changes, and may subsequently determine when a new value or a set of multiple new values is inconsistent with that determined historical data. In these cases, having a history of data for a sensor is important to ensure proper operation of the environmental monitoring system. In some embodiments, therefore, when the certification facility triggers replacement of an old sensor with a new sensor, the certification facility may additionally take steps to ensure a continuity of data regarding an environmental parameter and to ensure that a historical data for an environmental parameter is not lost when the old sensor is removed from the system and the new sensor is installed.

Accordingly, in block 706, the certification facility associates previously-received data, which was received by the environmental monitoring system from the old sensor, with the new sensor. The certification facility may perform the association in block 706 in any suitable manner, including by issuing an instruction to the environmental monitoring system to associate the data with the new sensor and, in some cases, by including an identifier (e.g., a serial number) for the new sensor in the instruction. The association may be performed in any suitable manner. In some embodiments, the association may be performed by storing an identifier for the new sensor together with an indication that data collected by the old sensor should be processed as if collected by the new sensor. In other embodiments, one or more records regarding the previously-received data may be edited to replace any identifier or relationship to the old sensor with information regarding the new sensor. As another example, in some embodiments both of the sensor units may be associated with the same "task," which may indicate a location that is being monitored and/or an environmental parameter that is being monitored, or other information describing monitoring that is being performed by the sensor unit(s). When both sensor unit(s) are associated with the same task, the data of the sensor units may be associated with the same task and with both sensor units.

In block 708, the certification facility determines whether a request is received from a user to view sensor data collected by the new sensor in a user interface of the environmental monitoring system. Such a request may be received at any suitable time, as embodiments are not limited in this respect. If no request is received, then the process 700 ends. However, if the certification facility determines that a request is received, then in block 710 the certification facility identifies a set of data to be displayed in response to the user's request for data collected by the new sensor. The certification facility may, in block 710, identify data that was received from the old sensor as well as data that was received from the new sensor and include both data in the set of data to be displayed. In block 712, the certification facility outputs the identified set of data in the user interface for display to the user. The user interface that is output for display may be any suitable user interface, including a set of one or more web pages, as embodiments are not limited in this respect. The user interface may identify that the set of data was received from the new sensor, such as by including the set of data together with an identifier (e.g., serial number) for the new sensor. The user interface may not include any indication that a portion of the data was received from the old sensor. Once the user interface is output in block 712, the process 700 ends.

As discussed in connection with FIG. 7, it may be advantageous in some embodiments for the environmental monitoring system to include a historical set of data for a sensor even in a case where the sensor is newly certified and newly installed in an environment. In cases in which a new sensor is to replace an old sensor, this historical set of data for the new sensor may be or include data previously received from the old sensor. The historical set of data may be helpful because, in some embodiments, an environmental monitoring system may perform a processing on data received from sensors, and that processing may rely in whole or in part on historical data for a sensor. The system may perform the same or similar processing for each of multiple sensors based on the data received from each sensor over time.

Figure 8:
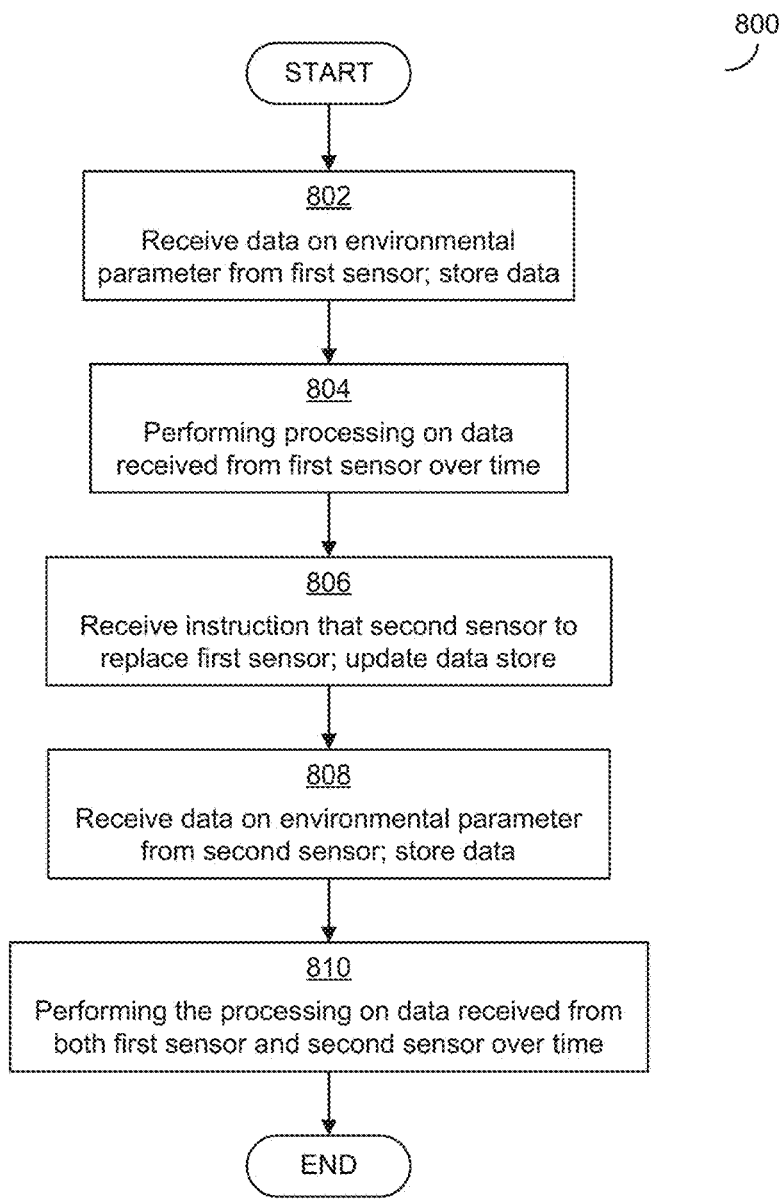
FIG. 8 is an example of a process that may be implemented in some embodiments by an environmental monitoring facility to process data received from old and new sensors in a case in which an old sensor is replaced by a new sensor.

FIG. 8 illustrates an example of a process that may be implemented by an environmental monitoring facility to process data received from sensors over time. Prior to the start of the process 800 of FIG. 8, a first sensor is certified by a certification system, distributed to an operator of an environment, and installed in the environment. The process 800 begins in block 802, in which the environmental monitoring facility receives data on an environmental parameter from the first sensor and stores the data in one or more data stores of the environmental monitoring system. The data that is received and stored may include any suitable information regarding the environmental parameter including a value sensed by the first sensor. The data may be stored in the data store together with data, including prior values of the environmental parameter, that were received from the first sensor.

In block 804, the environmental monitoring facility performs processing on data received from the first sensor over time. Any suitable processing may be performed, as embodiments are not limited in this respect. As one example, the facility may analyze the data received over time to determine one or more patterns exhibited by the data, such as cycles in variations of an environmental parameter over time. As another example, the facility may analyze the data received over time to determine one or more statistical values, such as an average value of an environmental parameter over time or average rate of change of the environmental parameter over time. As another example, the facility may analyze recently-received data, such as data received within a past threshold amount of time or threshold number of sensor readings to determine a current rate of change of the environmental parameter.

In block 806, the environmental monitoring facility receives an instruction from a certification system that a second sensor is to replace the first sensor in the environment. In response to the instruction, the environmental monitoring facility updates a data store of the environmental monitoring system to indicate that the second sensor is to replace the first sensor. Any suitable update may be made in block 806, including any of the examples discussed above in connection with FIG. 7. For example, the data store may be updated to include an identifier for the first sensor and an identifier for the second sensor together with an indication that the first sensor is to be replaced by the second sensor. As another example, the facility may update the data store to associate data, previously associated with the second sensor, with the first sensor. For example, records associated with the previously received data may include an identifier, or be linked to an identifier, for the first sensor and that identifier or link may be updated to be an identifier for the second sensor. In some embodiments, the records may be updated to account for a delay between when information is stored indicating that the new sensor is to replace the old sensor and when the new sensor begins transmitting data to the environmental monitoring system, to account for a delay from shipping the new sensor to the operator.

In block 808, the environmental monitoring facility receives and stores data from the second environmental sensor relating to the environmental parameter. The facility may receive and store the data in any suitable manner, including according to the same manner in which the data was received and stored in block 802.

In block 810, the environmental monitoring facility performs the same processing of block 804 on data received from the second sensor and on historical data for the second sensor. However, because of the updating of block 806, at least a portion (or an entirety, immediately following installation of the second sensor) of the historical data for the second sensor is data received from the first sensor. Accordingly, a processing performed on the data received from the second sensor may include data received from the first sensor. The data from the second sensor and from the first sensor may be processed together without regard to which sensor the data was received from or without distinguishing in any way between the data received from the two sensors. Thus, in some embodiments the environmental monitoring system may determine a current rate of change of an environmental parameter based on a most-recent value determined by a second sensor and values previously determined by a first sensor, or identify one or more patterns in changes in an environmental parameter based on values determined by both a first sensor and a second sensor. Once the processing of block 810 is performed, the process 800 ends.

As discussed above, in some embodiments when a sensor in an environment is to be replaced, upon receiving a new sensor the operator of the environment may send an old sensor back to an environmental monitoring system. In some such embodiments, the environmental monitoring system may operate similar to a subscription service in which new sensors are occasionally distributed to an operator and, in response, the operator is expected to send the old sensors back to the system. In some of these embodiments, as should be appreciated from the foregoing, the system may trigger the distribution of a new sensor without any problem being detected with the old sensor, but instead only because the certification of the old sensor is expiring or other condition being met by the certification. Thus, the sensor itself may still be functioning properly and may be reusable. The environmental monitoring system may recertify that sensor and redistribute it to a new environment.

Figure 9:
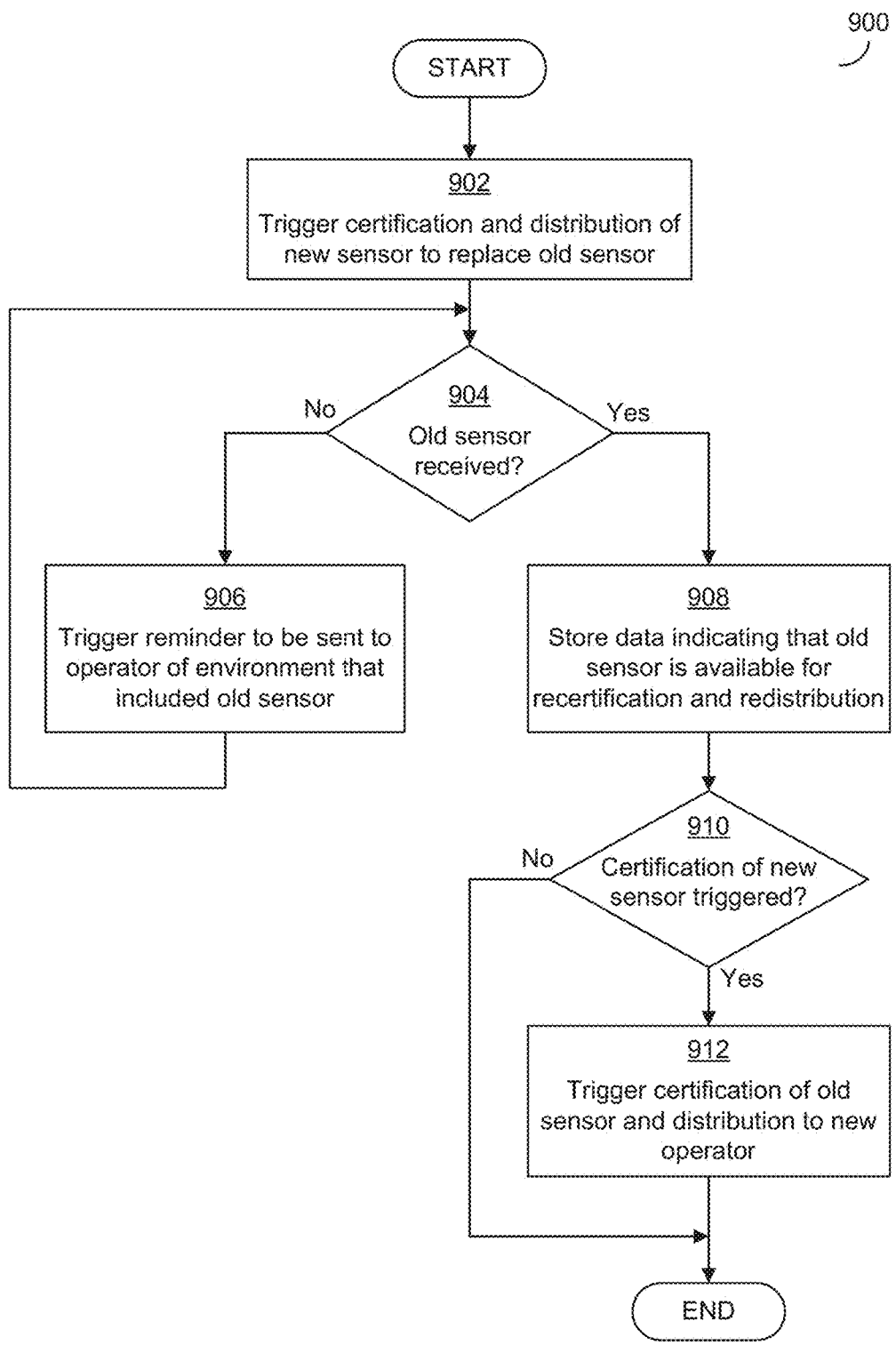
FIG. 9 is an example of a process that may be implemented in some embodiments by a certification facility to manage return, recertification, and redistribution of an old sensor following certification and distribution of a new sensor.

FIG. 9 illustrates an example of a process that may be implemented by a certification system to track return of an old sensor following distribution of a new sensor. The process 900 begins in block 902, in which the certification facility triggers certification and distribution to an operator of a new sensor to replace an old sensor. The triggering and distribution of block 902 may be performed in any suitable manner and in response to any suitable condition(s), including the examples described above.

In block 904, the certification system determines whether a data store of the certification indicates that the old sensor has been received from the operator. The determination may be made after a threshold period of time, such as after one week or one month, or may be made at any other time or in response to any other condition. If the facility determines that the data store does not indicate that the old sensor has been received, then in block 906 the certification facility triggers the sending of a reminder to the operator to return the old sensor to the certification system. The reminder may be sent and/or formatted in any suitable manner, including via a message displayed in a user interface of an environmental monitoring system, an email, a text message (e.g., SMS text message), a postal letter, or any other suitable manner. In addition, the certification facility may trigger the sending of the reminder in any suitable manner, including by instructing another system to send or display the reminder, outputting a message to a user to send the reminder, or by sending or displaying the reminder. After the triggering of block 906, the certification facility loops back to block 804 to determine again (e.g., after a threshold period of time) whether the old sensor has been received.

If, however, the facility determines in block 904 that the data store indicates that the old sensor has been received from the operator, then in block 906 the certification facility stores data in one or more data store to indicate that the old sensor is available for recertification and redistribution to an operator, which may be a different operator than the operator to which the sensor was previously distributed and from which the sensor was received. Any suitable data may be stored in block 908, as embodiments are not limited in this respect. In some embodiments, a serial number or other identifier for a sensor may be stored in block 908 together with an indication that the sensor is available for recertification and redistribution.

In block 910, the certification facility determines whether certification of new sensor is to be triggered. The facility may make the determination of block 910 in any suitable manner, including according to examples described above in connection with determining whether a certification of a sensor satisfies one or more conditions. If not, then the process 900 ends. If, however, the facility determines that a sensor is to be newly certified and distributed, then in block 912 the certification facility triggers recertification and distribution of the old sensor to an operator. The certification facility may trigger the recertification and distribution of the old sensor in any suitable manner, including by including a serial number or other identifier for the old sensor in a message relating to the certification to be performed or by triggering a sensor and, through coincidence, the old sensor being selected as the sensor to be certified.

Once the certification and distribution is triggered in block 912, the process 900 ends.

Techniques operating according to the principles described herein may be implemented in any suitable manner. Included in the discussion above are a series of flow charts showing the steps and acts of various processes that manage certifications of one or more sensors that are distributed or will be distributed to one or more environments to monitor environmental parameters of the environment(s). The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1006 of FIG. 10 described below (i.e., as a portion of a computing device 1000) or as a stand-alone, separate storage medium.

As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 10:
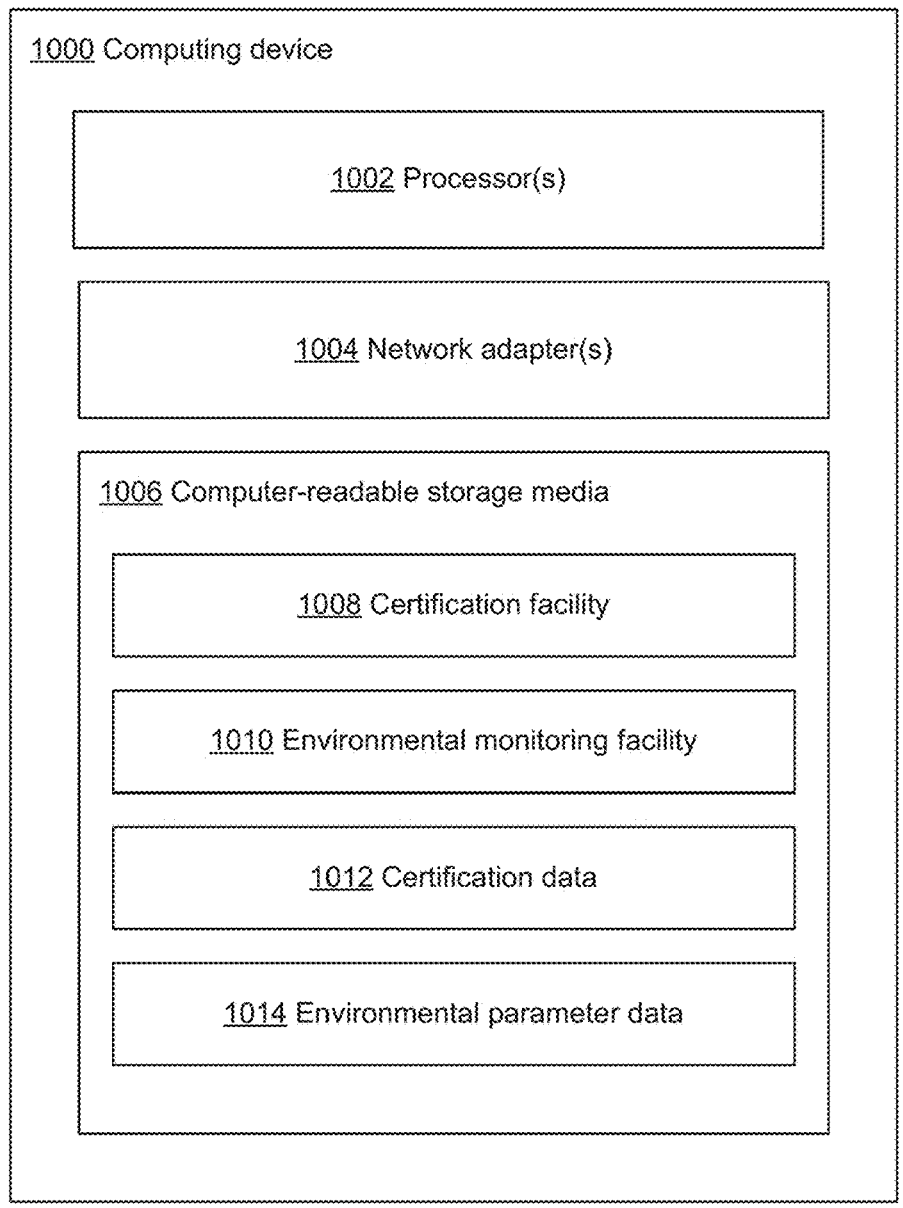
FIG. 10 is a block diagram of an exemplary computing device with which some embodiments may operate.

FIG. 10 illustrates one exemplary implementation of a computing device in the form of a computing device 1000 that may be used in a system implementing techniques described herein, although others are possible. It should be appreciated that FIG. 10 is intended neither to be a depiction of necessary components for a computing device to operate as a server of an environmental monitoring system and/or certification system in accordance with the principles described herein, nor a comprehensive depiction.

Computing device 1000 may comprise at least one processor 1002, a network adapter 1004, and computer-readable storage media 1006. Computing device 1000 may be, for example, a desktop or laptop personal computer, a personal digital assistant (PDA), a smart mobile phone, a server, or other networking element, or any other suitable computing device. Network adapter 1004 may be any suitable hardware and/or software to enable the computing device 1000 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1006 may be adapted to store data to be processed and/or instructions to be executed by processor 1002. Processor 1002 enables processing of data and execution of instructions. The data and instructions may be stored on the computer-readable storage media 1006.

The data and instructions stored on computer-readable storage media 1006 may comprise computer-executable instructions implementing techniques which operate according to the principles described herein. In the example of FIG. 10, computer-readable storage media 1006 stores computer-executable instructions implementing various facilities and storing various information as described above. Computer-readable storage media 1006 may store a certification facility 1008 implementing any of the techniques described above and an environmental monitoring facility 1010 implementing any of the techniques described above. The storage media 1006 may additional store certification data 1012, which may include electronically-formatted information regarding the manner of certification or results of certification of one or more sensors, or any other suitable information relating to certification, including any of the examples described above. The storage media 1006 may additionally store environmental parameter data 1014, which may include values of environmental parameters sensed by one or more environmental sensors over time.

While not illustrated in FIG. 10, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method of operating at least one computing device of an environmental monitoring system, the environmental monitoring system monitoring at least one environmental parameter of one or more environments, each environment of the one or more environments being owned and/or managed by an operator of one or more operators and being remote from the at least one computing device, the method comprising:
    storing, in at least one data store of the environmental monitoring system, first information regarding certification of proper operating performance of a first environmental sensor, the first information regarding certification comprising an expiration date of the certification;
    storing, in the at least one data store and in association with an account of a first operator with the environmental monitoring system, first data generated by the first environmental sensor, the first data generated by the first environmental sensor comprising a first value of a first environmental parameter sensed by the first environmental sensor in a first environment of the one or more environments, the first operator owning and/or managing the first environment;
    in response to determining that the expiration date of the first environmental sensor satisfies a condition, triggering distribution to the first operator of a second environmental sensor;
    storing, in the at least one data store and in association with the account of the first operator with the environmental monitoring system, second data generated by the second environmental sensor, the second data generated by the second environmental sensor comprising a second value of the first environmental parameter sensed by the second environmental sensor in the first environment,
    wherein storing the first data generated by the first environmental sensor and storing the second data generated by the second environmental sensor comprises receiving the first and second data transmitted over at least one wireless wide area network.

2. The method of claim 1, further comprising:
    in response to receiving at least one message from the second environmental sensor following distribution of the second environmental sensor to the first operator, registering the second environmental sensor with the account of the first operator with the environmental monitoring system, and
    associating the second environmental sensor with the first data previously received from the first environmental sensor.

3. The method of claim 2, further comprising:
    outputting for display a user interface that comprises at least a set of values of the first environmental parameter and an identification of the second environmental sensor, the set of values included in the user interface comprising the first value received from the first environmental sensor and the second value received from the second environmental sensor.

4. The method of claim 3, wherein outputting the user interface for display comprises transmitting at least one web page including the set of values.

5. The method of claim 2, wherein associating the second environmental sensor with the first data previously received from the first environmental sensor comprises associating the second environmental sensor with a task with which the first environmental sensor is associated.

6. The method of claim 5, wherein associating the second environmental sensor with the task with which the first environmental sensor is associated comprises associating the second environmental sensor with locating a particular environmental condition in the first environment and/or monitoring the particular environmental condition in a particular location within the first environment.

7. The method of claim 1, further comprising, in response to determining that the expiration date of the first environmental sensor satisfies the condition:
    triggering certification of the second environmental sensor; and
    storing, in the at least one data store of the environmental monitoring system, second information regarding certification of operating performance of the second environmental sensor, the second information regarding certification comprising an expiration date of the certification of the second environmental sensor.

8. The method of claim 7, wherein storing the second information regarding certification of the second environmental sensor comprises:
    generating an electronic certificate including at least some of the second information regarding certification of the second environmental sensor, the electronic certificate being stored in an electronic format that identifies at least one textual formatting option and/or one or more graphical elements to be included in a display of the electronic certificate;
    storing the electronic certificate in the at least one data store; and
    making the electronic certificate available via the worldwide web to the first operator of the first environment.

9. The method of claim 8, further comprising:
    triggering generation of an identifying tag to be applied to the second environmental sensor, the identifying tag comprising an unique identifier for the second environmental sensor and a web address for accessing the electronic certificate.

10. The method of claim 7, wherein triggering the certification of the second environmental sensor comprises triggering certification of a sensor of a same sensor type as the first environmental sensor.

11. The method of claim 1, wherein triggering the distribution of the second environmental sensor in response to determining that the expiration date of the first environmental sensor satisfies a condition comprises triggering the distribution of the second environmental sensor in response to determining that the expiration date is within a threshold period of time of a current time.

12. The method of claim 1, wherein
receiving the first data generated by the first environmental sensor comprises receiving the data from a first environmental sensor unit comprising the first environmental sensor; and
receiving the second data generated by the second environmental sensor comprises receiving the second data from the first environmental sensor unit comprising the second environmental sensor.

13. At least one computer-readable storage medium encoded with computer-executable instructions that, when executed by at least one processor, cause the at least one processor to carry out a method of operating at least one computing device of a certification system for use with an environmental monitoring system, the environmental monitoring system monitoring at least one environmental parameter of each of a plurality of environments, each environment of the plurality of environments being owned and/or managed by an operator of a plurality of operators, the environmental monitoring system maintaining information on an account of each of the plurality of operators, the method comprising:
storing, in at least one data store of the certification system, information regarding certification of operating performance of a first environmental sensor that is associated with a first operator of a first environment, the information regarding the certification comprising an expiration date of the certification;
in response to determining that the certification of the first environmental sensor satisfies a condition, triggering distribution of a second environmental sensor to the first operator; and
associating the second environmental sensor with data generated by the first environmental sensor.

14. The at least one computer-readable storage medium of claim 13, wherein the method further comprises:
outputting for display a user interface that identifies a set of data received from the second environmental sensor, the set of data identified in the user interface comprising both data received from the first environmental sensor and data received from the second environmental sensor.

15. The at least one computer-readable storage medium of claim 13, wherein the method further comprises storing data indicating that the second environmental sensor is to replace the first environmental sensor.

16. The at least one computer-readable storage medium of claim 13, wherein associating the second environmental sensor with data generated by the first environmental sensor comprises associating the second environmental sensor with a task with which the first environmental sensor is associated.

17. The at least one computer-readable storage medium of claim 13, wherein the method further comprises, in response to determining that the certification of the first environmental sensor satisfies the condition, triggering certification of the second environmental sensor.

18. The at least one computer-readable storage medium of claim 17, wherein triggering the certification and distribution of the second environmental sensor in response to determining that the certification of the first environmental sensor satisfies a condition comprises triggering the certification and distribution in response to determining that the expiration date of the certification of the first environmental sensor is within a threshold amount of time of a current time.

19. The at least one computer-readable storage medium of claim 13, wherein the method further comprises:
receiving a web address at which an electronic certificate demonstrating the certification of the second environmental address can be accessed; and
triggering generation of an identification tag for the second environmental sensor, the identification tag comprising an identifier for the second environmental sensor and the web address.

20. An apparatus for use with an environmental monitoring system, the environmental monitoring system monitoring at least one environmental parameter of each of a plurality of environments, each environment of the plurality of environments being owned and/or managed by an operator of a plurality of operators, the environmental monitoring system maintaining information on an account of each of the plurality of operators, the apparatus comprising:
at least one processor; and
at least one computer-readable storage medium encoded with computer-executable instructions that, when executed by at least one processor, cause the at least one processor to carry out a method of operating a certification system, the method comprising:
evaluating information regarding certification of operating performance of a first environmental sensor that is associated with a first operator of a first environment, the information regarding the certification comprising an expiration date of the certification;
in response to determining that the certification of the first environmental sensor satisfies a condition, triggering distribution to the first operator of a second environmental sensor for which proper operating performance has been certified; and
associating the second environmental sensor with data generated by the first environmental sensor.

* * * * *

UNITED STATES PATENT AND TRADEMARK OFFICE
CERTIFICATE OF CORRECTION

PATENT NO. : 10,401,237 B2
APPLICATION NO. : 15/590635
DATED : September 3, 2019
INVENTOR(S) : Harry J. Schechter It is certified that error appears in the above-identified patent and that said Letters Patent is hereby corrected as shown below:

On the Title Page

The Assignee section should read as follows:
(73) Assignee: Digi International, Inc., Minnetonka, MN (US)

Signed and Sealed this
Twelfth Day of November, 2019

Andrei Iancu
*Director of the United States Patent and Trademark Office*